(12) United States Patent
Aman et al.

(10) Patent No.: US 11,813,539 B2
(45) Date of Patent: Nov. 14, 2023

(54) PHYSICAL-VIRTUAL GAME BOARD AND CONTENT DELIVERY SYSTEM

(71) Applicants: James Andrew Aman, Celebration, FL (US); Jeffrey Paul Cheesman, Upper Saddle River, NJ (US)

(72) Inventors: James Andrew Aman, Celebration, FL (US); Jeffrey Paul Cheesman, Upper Saddle River, NJ (US)

( * ) Notice: Subject to any disclaimer, the term of this patent is extended or adjusted under 35 U.S.C. 154(b) by 54 days.

(21) Appl. No.: 17/546,315

(22) Filed: Dec. 9, 2021

(65) Prior Publication Data
US 2022/0111287 A1 Apr. 14, 2022

Related U.S. Application Data

(60) Division of application No. 16/869,651, filed on May 8, 2020, now Pat. No. 11,224,796, which is a division
(Continued)

(51) Int. Cl.
| | |
|---|---|
| *A63F 3/00* | (2006.01) |
| *A63F 13/214* | (2014.01) |
| *A63F 13/50* | (2014.01) |
| *G06F 3/01* | (2006.01) |
| *A63F 13/26* | (2014.01) |
| *A63F 13/213* | (2014.01) |
| *A63G 33/00* | (2006.01) |
| *A63F 13/65* | (2014.01) |

(Continued)

(52) U.S. Cl.
CPC ........ *A63F 3/00643* (2013.01); *A63F 13/213* (2014.09); *A63F 13/214* (2014.09); *A63F 13/26* (2014.09); *A63F 13/50* (2014.09); *A63F 13/65* (2014.09); *A63G 33/00* (2013.01); *G06F 3/011* (2013.01); *G08C 17/02* (2013.01); *A63F 2003/00665* (2013.01); *A63F 2003/00725* (2013.01); *A63F 2003/00826* (2013.01); *A63F 2009/0029* (2013.01); *A63F 2009/242* (2013.01); *A63F 2009/2435* (2013.01); *A63F 2009/2444* (2013.01); *A63F 2009/2486* (2013.01); *A63F 2009/2489* (2013.01)

(58) Field of Classification Search
CPC ...................................................... G06F 3/011
See application file for complete search history.

(56) References Cited

U.S. PATENT DOCUMENTS

2017/0024934 A1* 1/2017 Numaguchi .......... A63F 13/213

* cited by examiner

*Primary Examiner* — Gustavo Polo

(57) ABSTRACT

An entity enabled interactive gaming platform for deepening the engagement of a customer with an entity comprising and entity global eco-system and an interactive gaming system where the entity alters the provision of a product or service to a customer based at least in part upon any one of or any combination of game play datum associated with the customer having played an entity game. The global eco-system comprises a game structure including game rules, a game database and game overlay descriptions sufficient for printing or otherwise creating a physical game overlay. The interactive gaming system comprises a physical game board with a replaceable physical game overlay, game app and one or more electronically trackable physical game pieces including an identifier, where the replaceable game overlay is printed or otherwise created based at least in part upon the game overlay descriptions associated with the entity game to be played.

20 Claims, 8 Drawing Sheets

Related U.S. Application Data of application No. 16/027,301, filed on Jul. 4, 2018, now Pat. No. 10,688,378, and a continuation-in-part of application No. 15/975,236, filed on May 9, 2018, now Pat. No. 10,719,134.

(60) Provisional application No. 62/528,494, filed on Jul. 4, 2017.

(51) Int. Cl.
*G08C 17/02* (2006.01)
*A63F 9/24* (2006.01)
*A63F 9/00* (2006.01)

PHYSICAL-VIRTUAL GAME BOARD AND CONTENT DELIVERY SYSTEM

CROSS-REFERENCE TO RELATED APPLICATIONS

The present application is divisional of U.S. Non-Provisional application Ser. No. 16/869,651 filed on May 8, 2020. U.S. Non-Provisional application Ser. No. 16/869,651 filed on May 8, 2020 is a divisional of Ser. No. 16/027,301 filed on Jul. 4, 2018. U.S. Non-Provisional application Ser. No. 16/027,301 filed on Jul. 4, 2018 is now U.S. Pat. No. 10,688,378 issued on Jun. 23, 2020. This application claims the benefit of U.S. Provisional Application No. 62/528,494 filed on Jul. 4, 2017. U.S. Non-Provisional application Ser. No. 16/027,301 filed on Jul. 4, 2018 is a continuation-in-part of the U.S. Non-Provisional application Ser. No. 15/975,236 entitled INTERACTIVE OBJECT TRACKING MIRROR-DISPLAY AND ENTERTAINMENT SYSTEM filed on May 9, 2018 and issued on Jul. 21, 2020 as U.S. Pat. No. 10,719,134. U.S. Pat. No. 6,168,158 B1 issued to Bulsink on Jan. 2, 2001 is hereby incorporated by reference.

FIELD OF INVENTION

The present invention relates to physical board games that are capable of tracking the movement of game pieces and connecting with computing devices to provide simultaneous virtual gaming experiences including retrieving and outputting information and content maintained by an entity on a remote system, where the timing of the retrieving and outputting is based at least in part upon the detected movements of the game pieces.

BACKGROUND OF THE INVENTION

There are several popular forms of entertainment, socializing and relaxation including playing games, watching movies, going to theme parks, going camping etc. What is needed is a game that brings together elements from all of these forms.

Games can generally be divided between physical games and virtual games, where physical games are usually played in person with a physical board of some sort at a table with multiple players. Virtual games are typically played by a single player sitting at a computing device, although the single player may be connected and competing with many players via the internet.

Although the advent of the VHS tape and DVD was considered by some to be a "movie-theatre-killer," the movie industry has remained popular. With the significant advancements in technology, big-box office movies are also being challenged by cable, internet and independent movies. Some of the video games are now even releasing their storylines as companion movies, such as Doom, Pokemon or Wizard of Warcraft. What is evident is that movies and storytelling remain very popular and the tools for creating and distributing the movie content are advancing significantly while also democratizing through cost reduction.

Theme Parks and Amusement Parks are also continuing to experience growth in attendance and have become major destinations with on-site hotels for hosting family vacations. Theme parks like Universal Studios and Disney are also incorporating movie brands into their parks, for example Universal has Harry Potter, Transformers, Marvel Comics, etc. and Disney has its own Disney movies as well as now Star Wars and Avatar. Lego is a well-known toy company that also produces Lego movies and has several Lego Land Theme Parks.

Currently, enjoying physical games, virtual games, movies, tv dramas, theme parks, etc. is heavily compartmentalized and therefore tends towards separate and distinct experiences. Using a Theme Park as an example, the park guest enjoys significant physical experiences while at the park, where the experiences such as rides and public spaces do not change (they are not evergreen,) and they are not personalized. These experiences are also limited to park boundaries, both physical and access times. What is needed for both the Theme Parks and the guests is a means for extending and enhancing the guest experience. Extending is a question of where and when, therefore moving past the park boundaries into on-demand experiences in the hotels and even the home. Enhancing is a question of how and what, where how a guest can have experiences includes new means as described by the present invention and the related base invention. These new means include an INTERACTIVE OBJECT TRACKING MIRROR-DISPLAY AND ENTERTAINMENT SYSTEM (from the parent application) and the present invention of an PHYSICAL-VIRTUAL GAME BOARD AND CONTENT DELIVERY SYSTEM. Other variations of these teachings further extend to a park-wide gaming system that overlays onto the existing physical rides and public spaces including means for providing guests with secret messages and clues as well as tracking their movements and progress. In this way, the existing rides and public spaces are transformed becoming evergreen and personalized.

The what of enhancing the park experience includes new themed challenges, secret missions, clues, competitions and such that are new ways for park guests to enjoy themselves.

Using a movie franchise such as The Fast and The Furious, a cable series such as Game of Thrones, or a book brand such as Harry Potter as an example entity, the present invention and related parent application describe means for allowing the entity/brand/franchise to engage customers at home with information and content wrapped into a physical and virtual gaming platform. Customers can for example begin the game experiences, prior, during or after the release of new movies, cable episodes, or books, all as determined by the entity and designed into the game format. The opportunity to experience not-for-general-release, personalized, and/or pre-release content is expected to be a compelling draw for customers. The present physical-virtual game board serves as an erasable storyboard that continually transforms based upon the entities creative vision, where individual players take on the characters of the franchise or brand, for example presenting players with situations that will be faced by their favorite character in an upcoming release of the movie, cable episode or book. Players will have the opportunity to make choices, face dilemmas, or solve problems prior to knowing how the storytellers intend the character to act. Entities will have a unique means to see how their fans think the characters will choose and act, possibly influencing the actual upcoming release of a movie, cable show or book. The opportunity to enjoy games and receive community-wide recognition as well as earn entity rewards including valuable collectibles is also anticipated to be increase customer brand loyalty.

BRIEF SUMMARY OF THE INVENTION

The present invention is a physical-virtual board game that is a continuation-in-part of a parent application for a novel mirror-display. Some of the benefits of the herein taught physical game include a common game base capable of game piece tracking for which replaceable board game overlays can be inserted presenting an entirely new game, or an extension of an existing game. This concept is abstractly similar to the virtual gaming idea of "instances" and "leveling." These terms describe a game where the player starts within a certain virtual locality with a certain lower complexity or competition level. As the player successfully completes one level, a new level opens becoming increasingly more challenging. The present invention teaches how to use game overlays, virtual content and encoded ID game cards to simulate this same increasing challenge while not requiring another entirely new game. The present invention provides a means for a physical-virtual game board, where the physical game board overlay is replaceable paper than can be printed at home providing an entirely new experience for example matching the upcoming cable episode, and where the virtual game content such as questions, clues, video/audio clips are continuously changing as downloaded from the entity's cloud repository, such that the combination of low cost upgradable game parts and virtual content creates an evergreen personalized gaming platform. The game pieces for the present invention also use a trackable base onto which a figurine is attached, where the present invention anticipates using a 3D printer to create game piece figurines in the home, where the designs are created by the entity and downloaded for printing, similar to the game board paper overlays.

Another feature of the present invention is that it uses electronics to automatically track the movement of each player's game piece, where the game piece is pre-associated with the player. This tracked movement information is transmitted to a companion computing device already owned by the player(s), such as an IPad or Surface Pro tablet. On this computing device, there is a game app that is capable of tracking current game status and uploading information to, as wells as retrieving video/audio content over the internet from, the entity's cloud repository. The present teachings anticipate that the repository for this information and content would be maintained by entities such as Theme Parks, Amusement Parks, Movie Brands (e.g. Fast And The Furious,) Book Brands (e.g. Harry Potter,) Museums, our National Parks Association, the Boys and Girls Scouts of America, educational institutions, etc. These entities will be able to design at home games with pieces, storylines, questions, video/audio content that align with their themes and objectives. As players engage in the at-home board game, they will be able to receive special content in real-time corresponding to their journey in the physical-virtual game. Using this approach, the at-home game becomes evergreen and personalized. Furthermore, the entities maintaining the repositories and publishing the games are provided a new and exciting way of engaging and learning more about their customers, with the ability to accumulate customer benefits for rewards and incentives.

In the parent application from the present inventor, a mirror-display was taught that has many useful features. The mirror-display for instance included a display capable of outputting at least two spatially and/or temporally overlapping video sequences, where one of the videos would be perceptible to the naked eye, while the other video(s) would only be perceptible to a person wearing special glasses. These glasses where taught to be based upon: active shutter, polarization, or both.

Another useful feature of the mirror-display was that it included an object tracking system comprising a camera and software for recognizing and tracking the movements of special articles controlled by a guest in either two degrees of freedom (2DoF) or six degrees of freedom (6DoF). An example article is a Harry Potter Wand (as sold by Universal Studios) or LightSaber (as sold by Disney.) Other articles forms are possible, and by tracking the articles the guest was provided visual feedback for perfecting their article movements and for issuing commands to the mirror-display. Commands were taught to have many purposes, especially retrieving personalized information and content from the entity's repository (referred to as global and local eco-systems,) as well as controlling the local environment, such as lighting, sound and animatronics.

The present application teaches that this same mirror-display and its alternates have use in combination with the board game, either as a replacement or an adjunct to the computing device already owned by the player(s). Among many other novel disclosures, the present invention teaches the use of interactive wearables that are in communication with the game app running on the computing device or mirror-display and that provide real-time feedback to the player/wearer in relation to their progress in the board game. These wearables can take on several forms including a necklace, wristband or watch, a sash or smart scarf, a hat, etc. and have the optional capability of communicating with companion active shutter glasses. The present invention teaches how the game app is able to display video while synchronizing with the glasses such that the player receives "secret messages" that are otherwise not visible to the naked eye. The player may also use a personal mobile device such as their cell phone to act as game input and for receiving secret messages. The game board overlays are also taught to have the ability to reveal their own secret messages using thermographic display technology controlled by printed conductive circuits.

Another significant feature of the board game as taught herein is the inclusion of several forms of collectible items, where players receive this merchandise as a normal course of the game, a reward for game accomplishments, or through payment to the entities.

In the following description, numerous specific details are set forth, such as examples of specific components, types of usage scenarios, etc. in order to provide a thorough understanding of the present disclosure. It will be apparent, however, to one skilled in the art that the present disclosure may be practiced without these specific details and with alternative implementations, some of which are also described herein. In other instances, well known components or methods have not been described in detail in order to avoid unnecessarily obscuring the present disclosure. Thus, the specific details set forth are merely exemplary. The specific details may be varied from and still be contemplated to be within the spirit and scope of the present disclosure.

DETAILED DESCRIPTION OF THE INVENTION

Figure 1:
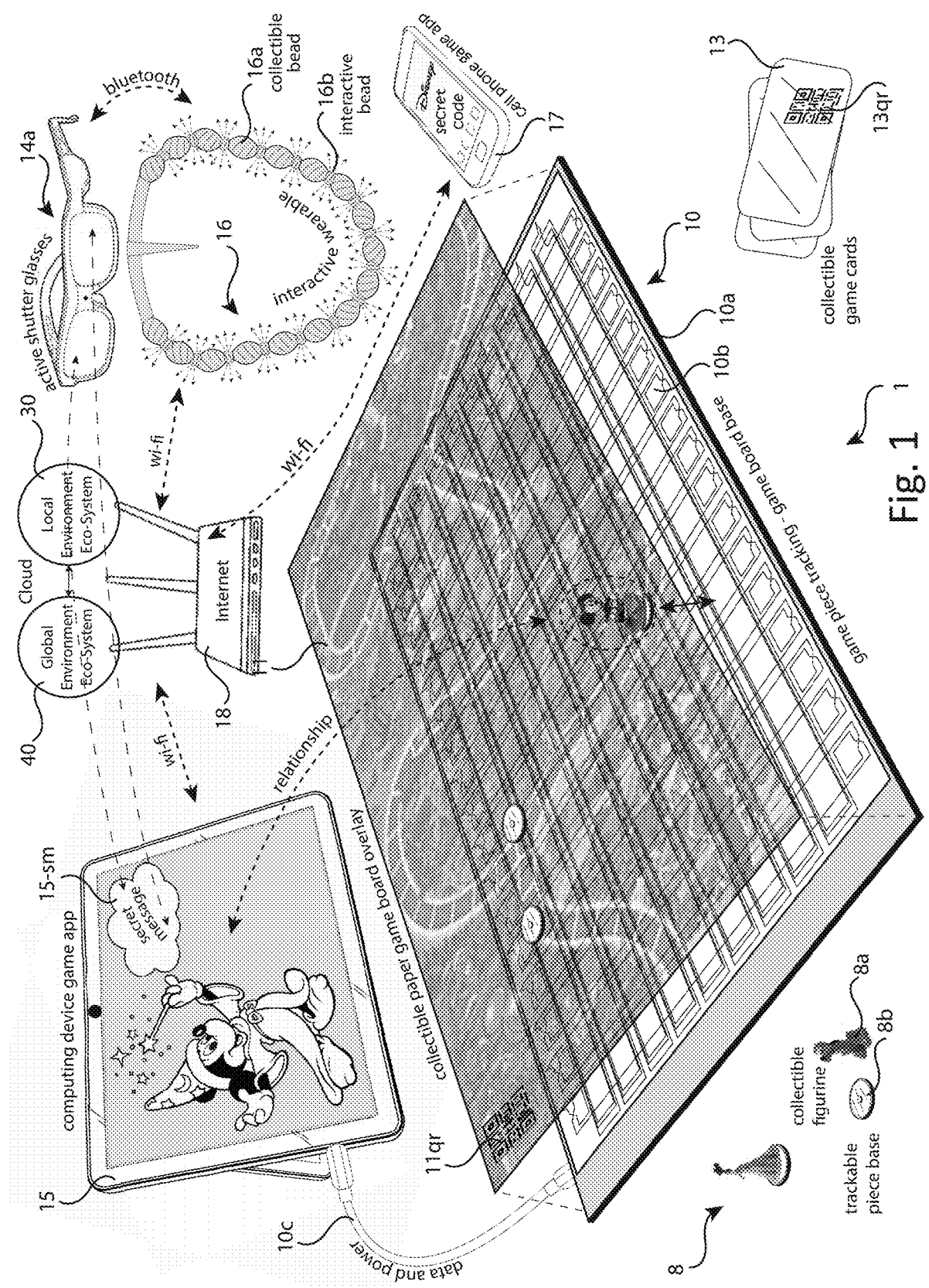
FIG. 1 is a perspective drawing of the main components of the present invention, including a game board 10 with collectible game board overlay 11, where game board 10 connects via data and power cable 10c to computing device with game app 15. Computing device 15 connects to internet 18 that provides access to both global environment eco-system 40 and local environment eco-system 30. Computing device 15 also connects wirelessly for example using WiFi with interactive wearable 16 and mobile device with game app 17, where wearable 16 connects to active glasses 14a, e.g. using Bluetooth. Game board 10 tracks the movements of game pieces 8 with separate collectible figurines 8a and is able to uniquely identify collectible game cards 13.

Referring to FIG. 1 there is shown a perspective drawing of physical-virtual game board and content delivery system 1. The main components of the system 1 include game board 10 in communication with computing device with game app 15, where device and game app 15 are further capable of communications with remotely stored content and information, where communications include automatically retrieving and displaying information and content in response to the movement of game pieces 8 as detected by game board 10.

Communications additionally include updating the remotely stored information regarding the present state of gameplay within system 1. As prior described in the parent application of which the present application is a continuation-in-part, the game board and content delivery system 1 are capable of extending the guest experience related to entities such as theme parks, movie and cable show producers, book brands, museums, etc., where the remotely stored content and information represents any combination of content and information maintained within either global environment eco-system 40 and local environment eco-system 30, where eco-systems 40 and 30 have been extensively described in the parent application and will not be described in detail herein. Regarding the interaction with content and information maintained in eco-systems 40 and 30, what is most important is that this content and information relates to an entity such as a theme park and the experiences a guest may have or have had, e.g. within the park, such that the present system 1 is essentially extending the entity experience by playing a board game with interactive content and information, where the playing may occur before, during or after, for example, a visit to the theme park.

Still referring to FIG. 1, additional main components of system 1 include interactive wearable 16 that is in communications with computing device and game app 15 as well as active shutter glasses 14*a*, such that automatic responses to the movement of game pieces 8 further include changes to the state of either or both interactive wearable 16 or active glasses 14*a*, where wearable 16 and active glasses 14*a* are preferably worn by and associated with a single player of board game 10. Device and game app 15 are also in communication with mobile device and game app 17, where preferably device 15 is used by one or more players of board game 10, whereas device 17 is preferably used personally by an individual player of board game 10. It is also possible that the device 17 is a "shared-private" computing device, such as a mobile device including a tablet, cell phone or game console that is running some implementation of the game app being executed on the "shared-public" device 15. Hence, the shared-public device 15 is substantially in all player's view and provides common virtual information, whereas the shared-private device 17 is passed around between players for example during that player's turn and can provide unique information including secret messages to the individual player, where that individual player may hold the device 17 such that its output (visual) information is substantially blocked from the view of all other players. Since the present system is tracking game piece movements for updating the game state in a game database, it is further anticipated that the "turn-order" of players for moving on the board 10 is pre-established using game app for example running on shared-public device 15. As the game pieces 8 are then tracked by board 10, the game app 17 uses the pre-known game-piece-to-player association along with the pre-known turn-order of players information to automatically determine which player is to have control of any shared-private device such as 17, whereby this player's symbol, name, or otherwise indication can be shown on the UI of device 17 and even a code or fingerprint can be accepted to confirm the player before providing any private information. Game app and device 17 is also useable for accepting a given player's unique response, for example an answer to a question or a choice to purchase or acquire game territory or assets, all as will be well understood by those familiar with board games.

Referring still to FIG. 1, as will be obvious to those skilled in the art of computers and communications, the present invention prefers that devices 15, 16 and 17 all communicate over a wireless connection such as a wi-fi connection to minimize physical connectors and cables. It is also preferred that the wi-fi system provides access to the internet 18 and therefore eco-systems 40 and 30. It is also preferred that wearable 16 communicates with active glasses 14*a* using Bluetooth and that game board 10 communicates with computer device 15 via data and power cable 10*c*. However, as will be well understood by those skilled in the art of computers, devices and communication systems, many variations are possible without departing from the novel teachings of the present invention, as such the specific communication means herein taught are exemplary and meant to teach general methods and therefore should be construed as exemplifications and not limitations of the present invention. What is most important is that the main components of system 1 are in real-time or near real-time communications and therefore capable of giving real-time or near real-time responses to at least the movement of game pieces 8 upon board 10.

Still referring to FIG. 1, game board 10 further comprises game board base 10*a* including game piece tracking electronics 10*b*, where replaceable game board overlay 11 lays on top of electronics 10*b* and base 10*a*, and where game players move game pieces 8 on top of overlay 11. Game pieces 8 further comprise figurine 8*a* attached to trackable piece base 8*b*, where piece base 8*b* is preferably a passive device that is detectable and uniquely identifiable by game piece tracking electronics 10*b*. As will be understood by those skilled in the art of both active and passive devices and tracking systems, several options are available for use as trackable piece base 8*b* and electronics 10*b*, at least including passive or active RF devices and systems. However, the present inventor prefers the use of resonant circuit technology described in U.S. Pat. No. 6,168,185 entitled DEVICE FOR DETECTING PLAYING PIECES ON A BOARD as taught by Bulsink (see FIG. 6 for a more detailed explanation of the Bulsink patent teachings and how they are adapted to the present invention.) One variation the present inventor prefers is that the "number of elongate transmit and receive coils in the board" form a detection matrix that is sufficiently granular with respect to the potential locations on the game board overlay 11 for placing a game piece 8. As will be understood by a careful consideration of the goals of the present system, unlike the Bulsnik system that was a chess board with well-known and pre-established locations of game pieces (essentially a fixed grid of evenly sized and spaced rows and columns,) the present invention anticipates that any given game board overlay 11 will have a varied surface including multiple locations for moving game pieces, where the sizes, spacing and juxtaposition of these locations is only restricted such that the underlying sufficiently granular electronics 10*b* can accurately detect and determine a given game piece 8 to be located on a specific location. The present inventor notes that the electronics 10*b* is shown as exposed for simplifying the teachings herein. As will be well understood by those familiar with electronics and plastics, game board 10*a* is preferred to completely envelope game piece tracking electronics 10*b* and due to the contactless nature of the preferred technology described in U.S. Pat. No. 6,168,185 or for example using RF tracking, the enclosing case 10*a* will not interfere game piece tracking.

Still referring to FIG. 1, as will be appreciated by those familiar with tracking systems, it is important that the overlay 11 is first calibrated with the electronics 10*b* and the computing device and game app 15. For these calibration purposes, the present inventor prefers that game board overlay 11 includes QR code 11*qr* that is scannable by device 15 using an embedded camera on device 15, such that device 15 uses the unique identification code to retrieve mapping information regarding the pre-known layout of the overlay 11. As will be appreciated by those skilled in the art of passive object identification, it is also possible that each overlay includes an embedded passive RFID, where fore example a mobile device such as a cell phone 17 in communications with the computing device and game app 15 can use native near field communications (NFC) sensors to automatically detect and determine and provide to game app 17 the unique code/id of overlay 11 by sensing the embedded RFID. However, such a solution requires at least one player to have access to a device such as 17 that includes an NFC sensor or equivalent, unless computing device 15 also already includes such a sensor (which is currently not typical for tablets and laptops.)

Referring still to FIG. 1, the present inventor also prefers the simple use of a visual alpha-numeric code, preferably located on the underside of the overlay 11, such that a player enters the alpha-numeric code into a user interface preferably provided by game app 15. What is most important is that each overlay has an identification means that is associated with pre-known mapping information, where the mapping information is then useable at least in part to determine the correlation between the detectable physical locations using game electronics 10*b* and the marked allowed game piece 8 locations of overlay 11, all as to be described in further detail below. For example, the mapping information relates game piece locations depicted on overlay 11 with respect to the sufficiently granular matrix of for example transmit and receive coils based upon the teachings in U.S. Pat. No. 6,168,185 comprising electronics 10*b*. The present inventor further anticipates and prefers that this pre-known mapping information is retrievable by game app and computing device 15 from a remote data sources such as the global 40 or local 30 eco-systems accessed via an internet connection 18. However, as will be well understood by those skilled in the art of information systems, the pre-known mapping information may also be provided using other methods such as a portable data storage media provided with the overlay 11.

Still referring to FIG. 1, as will be appreciated by those skilled in the art of computer systems and methods for calibrating any two physical objects, at least two types of mapping information are possible. In a first type of mapping information, each detectable physical location associated with electronics 10*b* is associated with a unique identifier in a data table, where for each unique physical location identifier zero or one marked locations associated with layout 11 are then further pre-associated with each unique physical location identifier such that a unique physical location detected by electronics 10*b* becomes a code for looking up in the data table to determine a unique marked location on layout 11 where a game piece 8 is located. In a second type of mapping information, each detectable physical location associated with electronics 10*b* and each marked location associated with layout 11 are associated with geometric data such as an [x, y] coordinate of the center of each physical or marked location or [x1, y1], [x2, y2] coordinates defining the area of each physical or marked location such that a unique physical location detected by electronics 10*b* becomes geometric data for comparing to geometric data associated with the game overlay 11 therein allowing a marked location to be determined through a mathematical comparison.

Using either or any type of mapping information for relating a physical location detectable by electronics 10*b* with a marked location on game overlay 11, it is desirable to understand the orientation of the game board overlay 11 with respect to the game board electronics 10*b*, for which at least four methods for determining the orientation are possible. In the first method, the game overlay 11 is constructed with respect to game board 10 such that it fits into game board 10 in only a single orientation and therefore the orientation can be assumed. One way of accomplishing this first method is to cause the game board 10 to include at least one angled corner that matches an angled corner of the game board overlay 11, where many other like "contour-fitting" solutions will be obvious based upon careful consideration. In a second method, both the game board 10 and overlay 11 may include indicative markings of how the overlay 11 should be inserted, where upon assuming the player properly follows the indicative orientation markings, the orientation of overlay 11 with board 10 can again be assumed. In a third method, a player can be directed to place a game piece 8 over a specific marked location on overlay 11, upon which a physical location as detected by electronics 10*b* is determined from which the orientation of the overlay 11 to the electronics 10*b* can be deduced. In the forth method, the game overlay 11 may further comprise detectable means like that included within a game piece base 8*b* (such as a resonant coil,) such that the game board electronics 10*b* can also automatically detect the orientation of the overlay 11 by sensing the detectable means.

Regardless of the method chosen for determining the orientation of a game overlay 11 with respect to the game board 10 or the method chosen for mapping physical locations detectable by game board 10*b* with marked locations on a game overlay 11, what is most important is that the game overlay 11 comprise one or more marked and pre-known game piece locations that are determinable using at least in part game piece physical location datum determined by the electronics 10*b* including at least the detected physical location within game board 10 above which a game piece base 8*b* is currently located, where it is then also preferred that the determined game piece physical location datum further include either an identifier or unique identifier associated with the game piece base 8*b*.

Referring still to FIG. 1, it is also preferred that the game base 10 includes its own unique identification code, like the overlay 11 identification code prior described. In addition to the various methods discussed for game app and computing device 15 to accept, receive or otherwise determine the overlay 11 identification code, the game base 10 may also provide is unique code electronically preferably upon establishing communications with game app and device 15. By providing a unique identification code for base 10, the system provides for multiple sizes and physical location variations between distinct game bases 10 that are thus differentiated with a different identification code. Using this approach, when mapping the physical locations as tracked by the game electronics 10*b* to the marked locations of a particular layout 11 differentiated by a unique identification code, it then is also important for the game app 15 to accept, receive or otherwise determine the game board 10 identification code that is then used at least in part along with the overlay identification code to retrieve the necessary pre-known mapping information.

Still referring to FIG. 1, once the marked overlay location-to-electronics detected physical location mapping is understood by game app and device 15, as electronics 10*b* detects for example which individual transmit/receive coils are affected by a particular game piece 8*b*, the game app running on device 15 is then able to determine what marked location with respect to the mapped game board overlay 11 the individual game piece 8*b* is resting above and therefore also then able to take some appropriate action. The present inventor anticipates that appropriate actions include at least any one of, or any combination of: 1) retrieving content or information from a content database, or outputting content through a user interface, where the content database is maintained either or both locally within the game app or remotely within eco-systems 40 and 30 (or otherwise an internet accessible database,) and where content includes any of video, audio, pictures, text, etc.; 2) updating a game database with respect to the change in the location of the game pieces 8, where the game database is maintained either or both locally within the game app or remotely within eco-systems 40 and 30 (or otherwise an internet accessible database,) where updating includes storing current game piece 8 locations, accumulating or calculating points, scores or any other information relevant to the game; 3) outputting action control signals for causing a change in the state of a game device including either interactive wearable 16 or active glasses 14*a*, or 4) outputting action control signals for causing a change in the state a second computing device 17, such as a mobile computing device including a tablet or cell phone, running some version of game app 15.

As will be appreciated by those skilled in the art of the various electronic components described in the present invention, "changing the state" of any given device is meant to be interpreted in the broadest of sense such that any feature associated with any of the devices 15, 16, 14a and 17 or herein taught or anticipated game devices may be initiated, actuated, controlled, altered, limited, and in any sense affected, where preferably the affect is immediately or soon detectable by any one or more players of the board game 10, but at least the affect changes a state of the device such that additional information in any humanly recognizable form at least including visual, auditory, tactile and olfactory is presented or further prepared for presentation at a later time to at least one game player.

Still referring to FIG. 1, as a careful reading of the parent application (of which this present application is a continuation-in-part) will show, game devices other than 15, 16, 14a and 17 may also be automatically affected by system 1, such as animatronics, room lighting, an audio system and even electronically controllable scent dispensers for effecting the olfactory senses. Animatronics comprise any robotic device or toy, for example including a robotic dog, cat, owl, alien figure, etc., where preferably the animatronics is capable of movement and/or emitting lights or sounds. The present inventor further anticipates that many such animatronics may also be engaged by themselves as a toy but then also activated in combination with system 1, thus increasing their useful value to the consumer. Animatronics, or in general robotics, are meant to include any device currently in the market or to become available in the market that in general receives action control signals and performs functions, where the action control signals provided by system 1 can be in any known communication form or protocol. Another example of a robotic device is a remote-controlled flying toy or a remote-controlled car, both of which are capable of being automatically controlled by system 1 in general response to the state of game play or timing and in particular response to the real-time or near-real time detected movements of game pieces 2.

What is at least preferred is that as a player lands upon certain game board locations, computing device and game app 15 automatically displays video and outputs audio of content either provided by eco-systems 40 and/or 30 or relevant to the entity associated with eco-systems 40 and 30 (including for example a theme park, amusement park, museum, school, etc.) What is further desired is that under some game-play circumstances, additional exciting effects are created by for example lighting up the LEDs forming interactive beads 16b on wearable 16, sending a message to cell phone and game app 17 that causes a vibration or audible output, activating room lighting and a sound system to for example create the effect of lighting striking, or causing an animatronic to begin moving or to speak a certain message. As will be well understood by those skilled in the art of home automation, there are many systems and device on the market today that allow for wireless, mobile device application control of home electronics including lighting, sound systems, fans, etc., and any solution is sufficient and considered to be within the scope of the present invention.

As will be appreciated from a careful reading of the present application and the parent application, there are many benefits provided by the presently taught physical-virtual game board and content delivery system 1, especially as used in combination with either or both a local 30 or global 40 eco-system. However, as will also be appreciated there are many benefits provide by the present system 1 that is not in communications with either of eco-systems 30 or 40, and such the use of the eco-systems 30 and 40 should be considered as exemplary rather than as a limitation of the present invention. Furthermore, game devices including animatronics such as just described may be controlled by action control signals exclusively provided by the game application 15 or provided by either of the game application 15 or an eco-system 30 or 40.

Still referring to FIG. 1, active glasses 14a have a particular and special function as will be well understood by a careful reading of the parent application. This special function is to operate in such a manner as to reveal secret message 15-$sm$ to the wearer as output for example by computing device and game app 15. While the associated parent application described many ways for revealing secret messages 15-$sm$ using multi-purpose glasses 14, (see present application FIG. 2a,) where multi-purpose glasses 14 operated either as active shutter, polarizing or active shutter and polarizing for the purposes of revealing secrete messages 15-$sm$, the present teachings prefer that active glasses 14a rely upon active shutters to reveal messages 15-$sm$. One important consideration is that system 1 rely upon computing devices owned by the players or player guardians to be loaded with the desired game app becoming computing device and game app 15. Using this limitation, computing device 15 is also expected to be un-modified and therefore not capable of emitting polarization modulated secret messages 15-$sm$, therefore requiring that glasses 14a at least use active shutters to reveal the messages 15-$sm$. While the present application assumes active shutter glasses 14a, the present inventor has taught means for adapting computing devices owned by the player or a player guardian such that the adapted device can emit polarization modulated secret messages 15-$sm$, therefore allowing the use glasses using polarization alone to reveal secret images 15-$sm$.

Still referring to FIG. 1, as will be well understood by those familiar with imaging systems, human visual perception and active shutter glass technology, it is possible that computing device and game app 15 output a sequence of images where the temporal combination is perceived as for example to be uniformly white by the un-aided eye, but by using an active shutter to block some portion of the sequence of images a secret message 15-$sm$ may be revealed. To best understand this approach, it is useful to know that a single image is actually made up of a spatial combination of pixels colored as red, green or blue, where each pixel is of a varying brightness (e.g. where 0 is black or no brightness and 255 is full brightness.) When spatially adjacent red, green and blue pixels are output at an even brightness, e.g. 255, then the red, green blue colors spatially combine to be perceived as white, as will be well understood by those familiar with the art of video images. Furthermore, if a first image includes every red pixel set to e.g. 255, while every green and blue pixel is set to 124, then the first image will by itself tend to appear reddish in color. If then a second image is displayed in an alternating fashion along with the first image, and in the second image every red pixel is set to 124 while every green and blue pixel is set to 255, then while the second image alone will tend to look cyan, the first and second images in temporal combination will tend to look white. Using this basic understanding, and as an example, device and game app 15 on occasion preferably output video that includes at least some spatial area 15-$sm$ that appears to be a first image(s) to the unaided eye (for example a white bubble cloud as depicted in FIG. 1 on the screen of device 15) but is really a sequence or composite of other multiple images that temporally blend to be perceived first image(s). Device and game app 15 are further capable of sending synchronization singles directly or indirectly to glasses 14*a* such this same spatial area appears as a second image, or secret message 15-*sm* to the wearer of active glasses 14*a* by limiting the number of received images for viewing by the wearer. Active shutter control signals sent by device 15 are directly received by multi-purposes glasses 14, as to be discussed in relation to upcoming FIG. 2*a*, or by interactive wearable 16 for conversion into second signals transmitted to and received by glasses 14*a*. As is well known in the art of active shutter glasses, these control signals are for turning off (opaque) and on (transmissive) the active shutter and thereby blocking some images of a stream of multiple images while transmitting other images of the same stream, where the transmitted images are perceived by the wearer of glasses 14 or 14*a* as a second image(s), or a secret message 15-*sm*.

As will be appreciated from a careful reading of the parent application, many variations for creating secret messages are possible and what is most important is that some apparatus and method is used, e.g. unaltered computing device 15 and active shutter glasses 14*a*, such that system 1 at select times determined by the game designer, is capable of outputting secret messages 15-*sm* to a given player. As the careful reader will also understand, secret message could also be transmitted as data to the player via their cell phone and game app 17, or as audio signals for example through speakers such as ear buds or what is known in the art as "bone" speakers incorporated into the active glasses 14*a*. Whatever apparatus and methods are chosen, it is also important that during game calibration the trackable piece base 8*b* is first associated with a particular player, such that as the player moves their game piece 8 to a given location as detected by electronics 10*b* and communicated to device and game app 15, game app 15 may then use the relationship between the player, the game piece 8 and detected board location to preferably interact with eco-systems 40 and/or 30 but otherwise to provide content and information responsive and appropriate to at least any one of, or any combination of: 1) the player (pre-associated with the game piece,) 2) the player's game piece board location, 3) the board game state at least comprising the location of all other game pieces, and 4) any other information or status such as awarded points and accumulated scores intended by the game designer and tracked in a game database running either on the game application 15 and/or on eco-systems 40 and/or 30.

Still referring to FIG. 1, as will also be understood by those familiar with wireless power transfer it is possible to further adapt electronics 10*b* to also transfer energy to game pieces 8, where game pieces 8 themselves are further adapted to include electronics for causing changes or outputs noticeable to the players. Typical well understood forms of short range power transfer include inductive coupling or capacitive coupling, where either technique is sufficient for the purposes of the present invention. What is important is that the game pieces are further capable of taking some action upon receiving an action control signal from device and game app 15, for example emitting light (such as through an embedded or attached LED,) emitting sound (such as through an embedded miniature speaker,) or making movement (where some portion of the figure for example is constructed of what is commonly referred to as a "smart material" that changes shape in response to applied electrical signals, including shape-memory alloys and shape-memory polymers.)

Still referring to FIG. 1, another anticipated benefit of the present system 1 is that many of the components are both interchangeable and collectible, including at least the piece figurine 8*a*, game board overlay 11, game cards 13 and bead 16*a*, where the bead 16*a* may be added or removed from interactive wearable 16. The collectible aspect provides opportunity for the associated entity, e.g. the theme park, amusement park, museum or school, to sell additional merchandise that also serves to keep the entire game and system ever changing. Another anticipated benefit is that the entity will design for example 24 levels of the board game, where each level includes at least a different game board overlay 11, but also may require new game cards 13 and offer new figurines 8*a*. If for example each level of the game could be upgraded every 2 weeks upon successful completion of the prior level, then the entity will have provided a year's worth of game levels. It is then anticipated that the entity will encourage the customer to sign up at least a year in advance of their planned visit (e.g. to a theme park,) thus providing the customer with enough time to play all 24 levels, receiving collectibles and achieving rewards all as intended by the game designer. As will be well understood, rewards can be provided in many ways at least including: 1) new collectible beads 16*a* for affixing to interactive wearable 16, 2) virtual points accrued as information on either eco-systems 40 and/or 30, where the virtual points may be used before, during or after a customers visit, 3) other merchandise, 4) other game figurines or associated animatronics, 4) or even a control signal that causes interactive wearable 16 to blink its interactive beads 16*b* in a certain pattern at certain times in certain locations, thus indicating a certain level of game accomplishment. As will be appreciated by those familiar with business goals, having a tool such as system 1 for attracting customers to accelerate their purchases is highly desirable. This unique design of the present invention also provides the entity with the opportunity of simply distributing digital information, such as printer files and 3D cad files, where the customer may then print their own new game board overlays 11, game cards 13 or game piece figurines 8*a*.

The present inventor further anticipates that system 1 in coordination with eco-systems 40 and/or 30 will manage the entire gaming experience with minimal staff involvement. For example, system 1 will preferably include a user interface for outputting information to the players that helps them review what levels they have achieved and when each level is reached eco-systems 40 and/or 30 will automatically request and even conduct either: 1) the automated or semi-automated printing and mailing of for example the game board overlay 11, game cards 13 or game piece figurines 8*a*, or 2) the transmission of electronic files to the customer so that the customer may then print their own new game board overlays 11, game cards 13 or game piece figurines 8*a*. System 1 preferably also provides players with a review of their currently awarded points and accomplishments, also providing the player with a user interface for converting awarded points into other merchandise, where the request and shipping of this merchandise may also be fully automated by either or both eco-systems 40 and 30 working in conjunction with the entity's inventory control and order fulfillment system of the order fulfillment system managed by some third party such as Amazon.Com, all as will be well understood by those familiar with business processing automation.

Still referring to FIG. 1, collectible game cards 13 preferable include some means for unique identification such as scannable QR code 13*qr* (or any other apparatus and methods already described as alternatives to game layout QR code 11*qr*.) While other passive and scannable technologies such as RF could be employed, a QR or bar code such as 13*qr* or 11*qr* (associated with game board overlay 11) have a distinct advantage in that images of the codes 13*qr* and 11*qr* can be captured and decoded by the game app using the camera traditionally found on most computing devices to be used as 15, such as an IPad or Surface Pro tablet. Regarding the detection of unique game cards 13 by the scanning of their QR or similar codes, the present inventor anticipates that device and game app 15 will in response provide to players a clue, question, message etc., all similar to the purposes of cards used in traditional board games except that traditional card messages are printed and therefore cannot change over time, player, game level and situation.

Figure 2A:
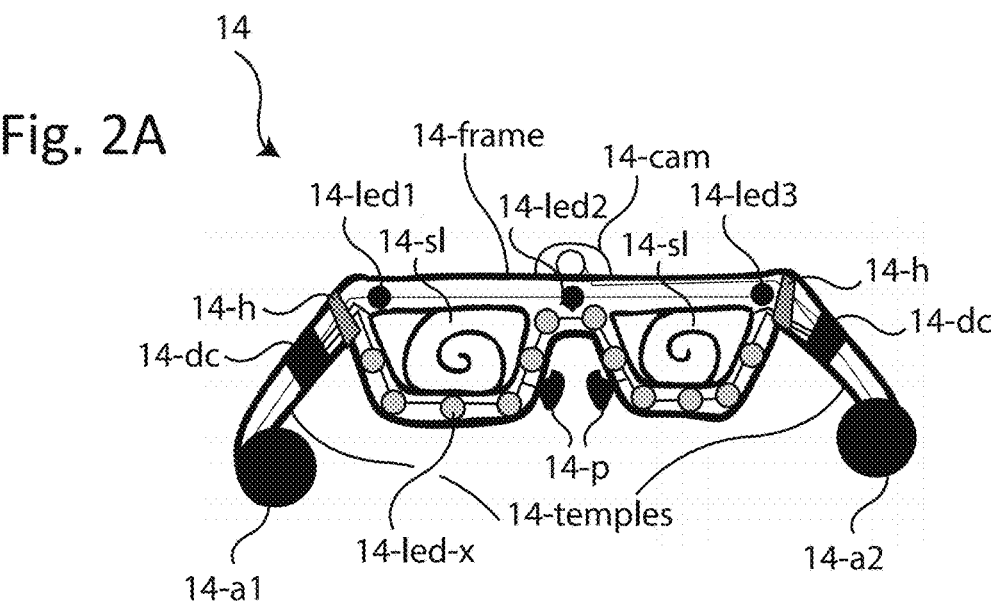
FIG. 2a is a front view diagram of multi-purpose glasses 14, as first described in the parent application from the present inventor. As first taught, multi-purpose glasses 14 had several configurations including active shutter, polarized (linear or circular,) or a combination of active shutter and either passive or active polarized. Multi-purpose glasses 14 also include detector-communicator 14-*dc* for controlling multi-purpose glasses 14 components and communicating with a control system prior taught as a mirror-display 20 (FIG. 3) but now also including at least computing device 15 (FIG. 1) where components include: hinges 14-*h*, pads 14-*p*, active shutter or passive or active polarization lenses 14-*sl*, hidden signal LEDs 14-led1, 14-led2 and 14-led3, visible signal LEDs 14-led-x, camera 14-cam, audio outputs 14-*a*1 and 14-*a*2.

In summary, the present inventor anticipates that at certain points during game play, a given player be required to move their piece 8, select and respond to cards 13, watch and respond to video/audio messages output on device with game app 15, receive and respond to secret messages such as 15-*sm* or secret communications to mobile device such as cell phone game app 17 or secret audible message transmitted to active glasses 14*a* (that include speaker outputs as will be reviewed in relation to upcoming FIG. 2*a*.) Subsequent to any of these game-player interactions, it is anticipated that the given player may use a response interface, for example as presented on either the computing device and game app 15 or any device in communications with the computing device and game app 15 such as a mobile device and game app 17 or a wearable device 16, to indicate some response, for example an answer to a question or a choice selection within a limited amount of time. It is also anticipated that multiple players may be playing at the same location with the same board game overlay/level at the same or different times, or that multiple players may be playing at different locations with the same board game overlay/level at the same or different times, where their accumulated game play is tracked on eco-systems 40 and/or 30 and made available to all players for review for example from an user interface presented by device and game app 17 or mobile device and game app 17. The present inventor anticipates that system 1 serves as a platform for a MMO (massively multi-player) game, where many players are playing throughout the world at various times at various levels all competing according to the intentions of the game designers.

What is important to understand is that system 1 maintains a game database necessary for processing the game as intended by the game designer, where the game database includes any information determined or received by system 1 such as game piece 8 locations, player-to-game piece 8 associations, player responses to game app 15 outputs, calculated points, scores or any other game information. System 1 can be operated in different modes including: 1) a local mode without any access to either of eco-systems 40 and/or 30 where the game database is maintained by the game app and computing device 15 and all game outputs including content, information and action control signals are determined and provided by the game app 15; 2) a remotely updated local mode where the game app and computing device 15 exchange some datum with either of eco-systems 30 or 40 such as for initially establishing the game play prior to game commencement or for updating final game results after game play where the game database is maintained by the game app and computing device 15 and at least some information comprised with the local game database is shared with the remote eco-system, and where all game outputs and action control signals are determined and provided by the game app 15, and 3) a remote mode where the game app and computing device 15 is in substantially real-time communications with either of the eco-systems 40 and 30, where any portion of the game database is maintained on either or both of the game app and computing device 15 or eco-systems 40 or 30, and where any game outputs and action control signals are determined and/or provided by any one of, or any combination of the game app 15 or the eco-systems 40, 30.

Referring next to FIG. 2*a*, there is shown a front view diagram of representative multi-purpose glasses 14 as they were first described in the parent application. In summary of the teachings in the parent application, multi-purpose glasses 14 comprise a frame 14-frame and temples 14-temples, where 14-temples are hinged such that they may be opened orthogonal to 14-frame for fitting over a player's head and onto their ears. The preferred multi-purpose glasses 14 further include: 1) hinges 14-*h* that are capable of sensing whether 14-temples are currently open, and therefore wearable, or closed and therefore not wearable, 2) pads 14-*p* that are capable of sensing whether 14-frame is resting on guest 2 nose or not resting on nose, 3) left and right active shutter or passive or active polarizer lenses 14-*si* that are capable of alternating between blocking or receiving image states as prior discussed, 4) hidden signal LEDs such as 14-led1, 14-led2 and 14-led3, 5) visible signal LEDs such as one or more 14-led-x, 6) camera 14-cam, 7) audio outputs 14-*a*1 and 14-*a*2, and 8) detector-communicator 14-*dc* comprising additional orientation and location detectors, haptic or kinesthetic communication, a computing element and communications elements for communicating with hinges 14-*h*, pads 14-*p*, hidden signal LEDs 14-led1, 14-led2 and 14-led3, visible signal LEDs 14-led-x, camera 14-cam, audio outputs 14-*a*1 and 14-*a*2 as well as mirror-display 20 (see FIG. 3.)

Figure 2B:
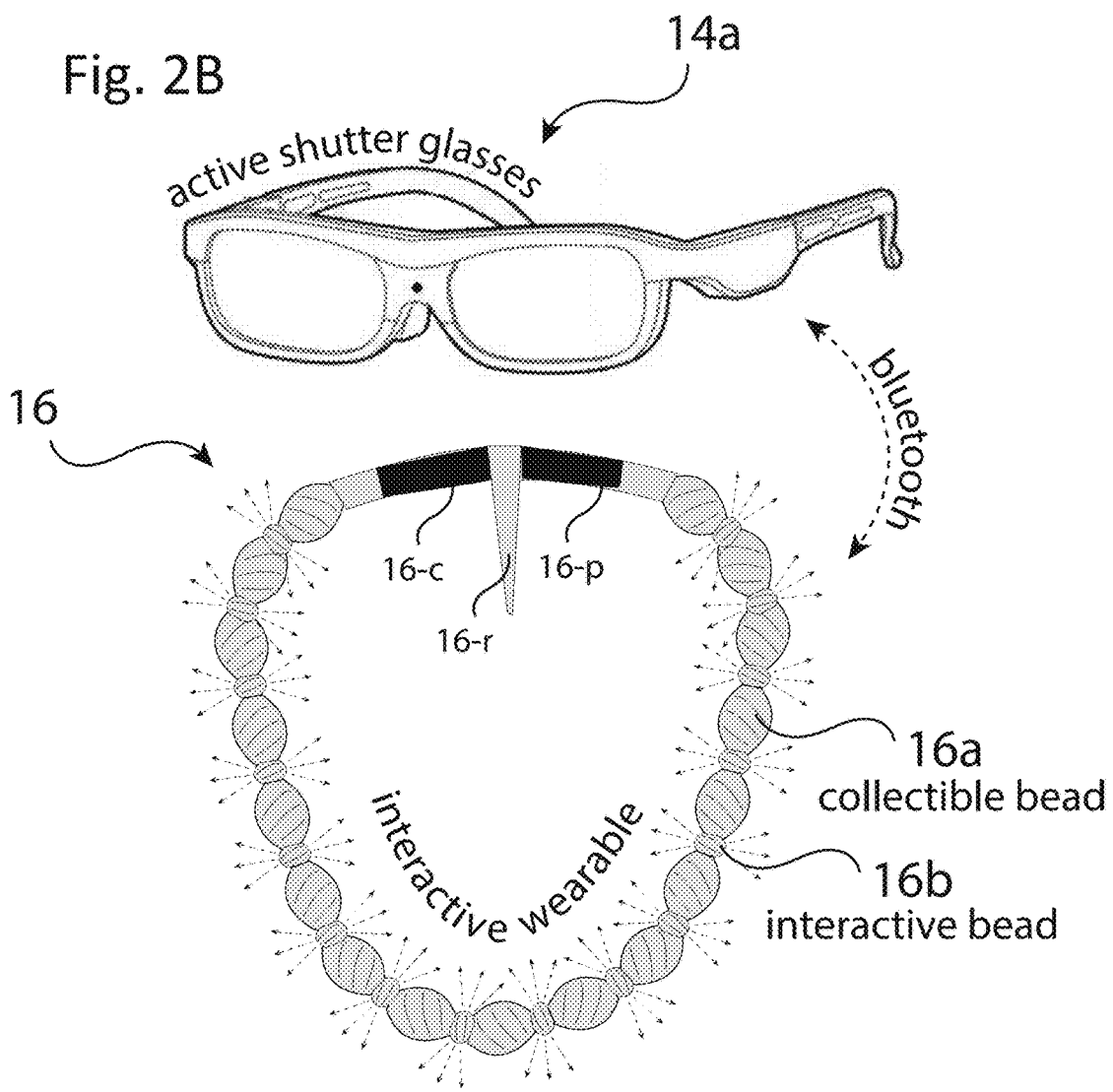
FIG. 2*b* is a front view diagram of active glasses 14*a* and interactive wearable 16. Active glasses 14*a* and wearable 16 are an alternate implementation of multi-purpose glasses 14 and together include the major components and functions of related multi-purposes glasses 14.

Referring now to FIG. 2*a* and FIG. 2*b*, one major difference between active shutter glasses 14*a* and multi-purpose glasses 14, is that active shutter glasses 14*a* must at least included an active shutter for lenses along with the processing for receiving control signals for indicating the opening and closing of the active shutter in synchronization with the display of video on computing device and game app 15, where with multi-purpose glasses 14 this was optional as polarization could also be employed. The functioning of active shutter glasses is well known in the art and were also discussed in detail in the parent application. As mentioned in the prior paragraph, and in the parent application, multi-purpose glasses 14 may be either active shutter or passive or active polarizer lenses. The parent application also teaches that multi-purpose glasses 14 can have both active shutters and passive or active polarizing lenses. Having both is also optional for active glasses 14*a*, namely, what is most important is that active glasses 14*a* include and active shutter, but they may then also optionally include passive or active polarizers. While an active shutter is sufficient for glasses 14*a* to receive secret messages 15-*sm* as output from computing device with game app 15, all as prior described, there is at least one advantage to also including polarizers (e.g. either linear or circular, either passive or active.) The physical-virtual game board and content delivery system 1, and all its components such as active glasses 14, has significant value without requiring any additional uses, all as will be evident from a careful reading of the present invention. However, it is anticipated that a family with players of the board game 1 will ultimately be visiting the associated entity, for example a theme park, amusement park, museum or school. At his entity, especially theme parks, amusement parks and some museums, there may already be activities that provide 3D video experiences. Typically, these 3D experiences rely upon glasses that use polarizers and not active shutters. If active glasses 14*a* also include the necessary polarizers, then while at a theme park for instance, a particular 3D ride can send out signals to always keep the active shutter open on glasses 14*a*, such that the 3D left-right images are then received properly through polarizers added to active glasses 14*a*. This has at least one advantage for the wearer in that they can keep using their own active glasses 14*a* when at the park without switching these glasses 14*a* for theme park 3D polarizing glasses when going on the 3D rides.

Still referring to FIG. 2*a* and FIG. 2*b*, a second difference between active shutter glasses 14*a* and multi-purposes glasses 14, is that the major functions that were entirely incorporated in multi-purpose glasses 14*a* have been divided between active glasses 14*a* and interactive wearable 16. There are many advantages to this dividing as to be explained herein, but one significant advantage is that the cost of the active shutter glasses 14*a* will then be less than the cost of multi-purpose glasses 14. While the additional cost of the interactive wearable 16 is expected to more than make up this cost difference, hence the combination of 14*a* and 16 will most likely be more than multi-purpose glasses 14*a*, interactive wearable 16 has its own independent value, especially because of the features it has adopted from multi-purpose glasses 14*a* and it would not be advantageous to repeat features in both active glasses 14*a* and wearable 16. Furthermore, as will be discussed shortly with respect to upcoming FIG. 2*b*, while active wearable 16 is shown as a necklace, wearable 16 is anticipated to adopt multiple forms including a wristband or watch, a sash or smart scarf, a hat, etc. Another advantage is that by splitting the functions of multi-purpose glasses 14 between active glasses 14 and wearable 16, the overall weight of active glasses 14*a* is reduced compared to multi-purposes glasses 14. Other advantages will be apparent to those skilled in the art of communication systems, active shutter glasses and wearables, and will become apparent from a careful reading of the present invention.

Still referring to FIGS. 2*a* and 2*b*, what is most desirable and minimally sufficient for active glasses 14*a* is that they provide the well-known functionality of active shutter glasses in that they can be remotely controlled via wireless signals to open and close their electronic shutter in synchronicity with the output of video from computing and game app device 15. This requires well known features such as the active shutters forming the lenses of glasses 14*a*, sufficient battery power as well as communications and control signal processing means. The present inventor also prefers that active glasses 14*a* further include audio outputs 14-*a*1 and 14-*a*2 so that the wearer can receive audio including secret audio messages as output for example by computing device and game app 15 in combination with the playing of board game 10. The other features described for multi-purpose glasses 14 do also have significant value and the present inventor anticipates that active glasses 14*a* come in multiple varieties, starting with the basic active shutter and audio, and then optionally including camera 14-cam such that the wearer's experiences can be captured and transmitted as a part of the multi-player game, especially where some of the multi-players are remote from each other. Another useful option would be the hidden signal LEDs such as 14-led1, 14-led2 and 14-led3, which as explained in the parent application, provide an excellent non-visible signal to help with head motion tracking assuming that the tracking camera can detect IR energy. Another useful option is the haptic or kinesthetic device included in 14-*dc* that provides vibration feed-back to the wearer. Also, visible signal LEDs such as one or more 14-led-x can be included so that a variant of active glasses 14*a* could be caused to light-up, for example when the wearer has achieved some significant point in the board game where the computer and game app 15 then transmit a signal to activate LEDs 14-led-x. And finally, as will be well understood by a careful reading of both the parent application and the present invention, if multi-purpose glasses 14 include active shutters with a remote communication link, then multi-purpose glasses 14 could also be used with system 1 in place of active glasses 14*a*, either with or without also using interactive wearable 16. Hence, the present inventor anticipates that some board game players could only be wearing multi-purpose glasses 14 with active shutter lenses, while other board game players are wearing active shutter glasses 14*a* along with interactive wearable 16, where interactive wearable 16 is adopted to be available in any of multiple forms including a wristband or watch, a sash or smart scarf, a hat, etc. And finally, it is noted that since active glasses 14*a* preferably include Bluetooth communications, it is possible that computing device and game app 15 communicate directly with active glasses 14*a* since Bluetooth is a typical feature built into most computing devices in today's marketplace.

Referring to FIG. 2*b*, there is also shown interactive wearable 16 in the form of a necklace, where as previously mentioned what is most important about wearable 16 is not its form but rather that it is worn by a person and is not active glasses 14*a*. It is also desirable that wearable 16 have the capability to communicate with active glasses 14*a* as will be discussed shortly in more detail. However, as will be appreciated by a careful reading of the present invention it is not mandatory that wearable 16 be able to communicate with active glasses 14*a* as wearable 16 has useful functions within system 1 regardless of actives glasses 14*a*. Furthermore, as previously mentioned, the person or player could be using multi-purpose glasses 14 with active shutters which have their own direct communications with computing device and game app 15. As prior mentioned, any form of wearable 16 is considered to fall within the scope and teachings of the present invention, including a wristband or watch, a sash or smart scarf, a hat, etc. For example, as is well-known the Boys and Girls Scouts of America have sashes that are draped over their shoulders upon which they sew their merit badges to indicate they have successfully accomplished a task. The present invention anticipates that the board game 1 can be adopted into the scouting programs in which case the entity for maintaining and distributing content and information via eco-systems 40 and/or 30 is the national organization associated with scouting. The sash as a wearable would then include minimal features, the same as depicted for wearable necklace 16, especially including power source 16-*p* and a computing and communications element 16-*c*. Element 16-*c* is like detector-communicator 14-*dc* shown in glasses 14 and described in detail in the parent application. Element 16-*c* is capable of all the same functions of detector-communicator 14-*dc* except those that are specific to glasses 14, for example detecting through hinges 14-*h* whether 14-temples are currently open, and therefore wearable, or closed and therefore not wearable, or detecting through pads 14-*p* that 14-frame is resting on player's nose or not resting on nose. However, while element 16-*c* is like detector-communicator 14-*dc*, one of the main benefits of separating the functionality of multi-purposes glasses 14 as described in the parent application to be divided between a wearable 16 and active glasses 14*a* is that both wearable 16 and active glasses 14*a* would individually be simpler devices than multi-purpose glasses 14.

Still referring to FIG. 2*b*, a preferred minimum function of wearable 16 is to provide a wireless communications path with computing device and game app 15, where the communication path is preferred to be a wi-fi connection but can be of any appropriate form as will be well understood by those skilled in the art of distributed computing and communication systems. Again, wearable 16 optionally communicates with active glasses 14*a*, for example using Bluetooth, such that computing device and game app 15 can effectively control at least the active shutter of glasses 14*a* by sending first communication signals to wearable 16 which are then converted to second communication signals by wearable 16 and transmitted to glasses 14*a*. As will be obvious to those skilled in the art, if wearable 16 communicates with device 15 through a wi-fi connection, it has a much-increased distance for communication verses the limited Bluetooth range that is preferred for the wearable 16 communicating with glasses 14*a*. As prior stated, it is not mandatory that wearable 16 communicate with glasses 14*a*, for example mobile device and game app 17 could fulfil this similar communication and control role. Specifically, cell phones (or mobile devices in general) useable as 17 generally include both wi-fi and Bluetooth communication capability, and as such computing device and game app 15 could control active glasses 14*a* by sending the first signals first to mobile device and game app 17. Since mobile device 17 includes a game app that provides some, all or different functions then the game app loaded onto computing device 15, it is also possible that mobile device and game app 17 issue second control signals to glasses 14*a* without having received first signals from computing device 15. Again, what is most important is that a player have some personal device, such as a wearable 16 or a carriable 17 that can communicate with any one of, or any combination of: computing device and game app 15, global eco-system 40, local eco-system 30, or mirror-display 20 (see FIG. 3.)

Still referring to FIG. 2*b*, another preferred minimum function of wearable 16 is to provide an electronically controlled display element such as inactive beads 16*b*, where beads for example comprise one or more LEDs. What is most important about interactive beads 16*b* is that they are controllably activated by computing device and game app 15, for example to indicate an exciting moment in board game 10. Preferably, beads 16*b* have multiple colors and may also be individually rather than just collectively controlled. As the careful reader will see, many options are possible. The present inventor further anticipates that beads 16*b* include an outer transparent, semi-transparent or translucent shell encasing the lighting element such as an LED, where the shell may also include markings such as letters, runes, hieroglyphs, or symbols associated with the entity providing content and information, the board game 10 or the board game overlay 11, such that device 15 may individually turn on and off given beads, each with unique markings, either simultaneously or in a sequence, where the interpretation and understanding of which becomes a part of the overall game. The present inventor also anticipates using beads 16*b* to encode some form of a calendar or preferably a countdown timer. For example, if the wearable 16 belongs to the child in a family that is booked for an upcoming vacation to a theme park, when the family and child receives their wearables 16, the time in months, weeks and days can be counted down until they depart for their trip. This function could be performed on the wearable separate from the wearable 16's use during real-time game board 10 play.

Furthermore, the present inventor anticipates that wearable 16 include some form of sensor or button whose actuation is detectable by computing and communications element 16-*c*, such that for instance when the wearer of wearable 16 engages the sensor or button, wearable 16 either alone or in communication with any of devices 15 or 17 or eco-systems 40 or 30 then engages one or more interactive beads 16*b* to provide coded information, e.g. how many days are left before the vacation starts.

Still referring to FIG. 2*b*, an optional function of wearable 16 is to provide tracking of, and communications with, the individual wearer with respect to a guardian and/or the entity (e.g. a theme park.) As will be well understood by those familiar with a category of commercially available products referred to as "child tracking devices," there are several technologies and many implementations available that are all sufficient for inclusion in wearable 16. The several technologies include: GPS/A-GPS, Wi-Fi Google Touch Triangulation, Cell-ID, all of which for example can interface with Google Mapping. Several of these devices also include "S.O.S signals," such that the wearer can signal for help. What is most important with respect to the present invention 1 is that wearable 16 can be provided with the additional child-tracking technology incorporated into many other wearables. In this way, unlike all other wearables commercially available, wearable 16 with included tracking can serve at least 3 major and useful functions, specifically: 1) interacting with system 1 and any of its components as described in both the parent application and the present continuation-in-part; 2) acting as a group-member tracking device when a group (such as a family of school class) is for example together at the entity, such as a theme park, where the guardian is using the mobile device with game app 17 to be alerted, notified, directed regarding the location of the wearable 16, including any or all of the functions currently available in child tracking devices or similar, and 3) acting as a guest tracking device for either the global eco-system 40 or the local eco-system 30 associated with the entity, where, as prior discussed in the parent application, this guest tracking capability has many and significant uses beyond security and guest safety especially the use in a parkwide gaming system or in queue management and logistics.

Still referring to FIG. 2*b*, an optional function of wearable 16 is depicted as two-way radio 16*r* that allows the wearer to verbally communicate with other group members or the guardian. A commercially available technology for implementing optional two-way radio 16*r* is known as "Radio over IP" (RoIP) that is similar to the internet-based telephone, or "Voice of IP" (VoIP.) RoIP is implemented by transmitting and receiving radio signals over a WLAN (Wireless Local Access Network.) As will be well understood by those familiar with WLAN radio, instead of communicating with another radio directly, each two-way radio 16*r* communicates with other radios through an existing wireless computer network, and in that sense, is technically more of a network device than a traditional radio. As will also be appreciated by those familiar with entities such as Theme Parks, it is common that the entity provides a wireless signal throughout the entire controlled area of the entity. As such, any visitor to the entity, such as a Theme Park, can then verbally communicate with other group members using their wearable 16 with wearable radio 16*a*. Radio 16*a* would connect to the entities WiFi similar to a cell phone such as 17. What is most important to understand is that wearable 16 is optionally capable of implementing any of the available technologies for two-way communications, such that group members may audibly communicate with each other. The present inventor prefers using RoIP since it extends to the boundaries of the WiFi signal provided by the entity and is not limited to normal antenna range issues. The present inventor anticipates that the same technology is then usable in the home environment, where for instance the parents of children can verbally communicate with their children who are either playing board game 10 or simply wearing wearable 16 within the range of the home environments WiFi signal. It is anticipated that the parent might be using their own wearable 16, or instead are using their mobile device such as cell phone with game app 17, where the game app provides the additional two-way communication processing. Finally, the present inventor anticipates that wearable 16 includes a microphone for picking up the wearer's voice, and optionally a speaker for outputting the incoming voice. An alternate implementation anticipated by the present invention is that wearable 16 communicates two-way radio signals to glasses 14a if determined to be connected to the network, such that at least the audio output available on glasses 14a could be used for outputting the incoming voice.

Still referring to FIG. 2b, wearable 16 preferably includes some form of collectible beads 16a, where the form is less important than the purpose and intent, which it to attach and display rewards and achievements icons associated with the board game 10 specifically, or with the entity, such as a theme park, museum, national club like the Boys and Girl Scouts, a school, etc. For example, collectible beads 16a could be removable/upgradable and include different symbols, theme character depictions, colors, or otherwise markings indicative of the status, level, achievements, etc. of a wearer. Once anticipated example is that of a Theme Park, where a family receives the board game system 1 prior to coming to the park and engages on several sequential board games 10 as represented by new overlays/levels, where during the playing of each game individual players are accumulating points and rewards that automatically are exchanged for collectible beards 16a (or similar), where the system 1 understands to automatically fulfill and distribute beads 16a to the family or has the reward beads 16a available for pick up when the family arrives for their vacation. Accumulated rewards could also be used by the individual person to select their own collectible beads 16a. In any case, like the Boys and Girls Scouts sash, using any form of a wearable 16 such collectibles serve a time-tested purpose of allowing the individual to show their achievements.

Still referring to FIG. 2b, as prior mentioned and especially as taught within the related parent application regarding multi-purpose glasses 14, any of the components and functions not specifically related to the glasses form (such as frames, temples, lenses, etc.,) may optionally or alternatively be incorporated into wearable 16 in any of its forms, including a necklace, wristband or watch, a sash or smart scarf, a hat, etc. For example, a useful function for wearable 16 is to provide a unique ID to system 1 via computing device and game app 15 and/or mobile device and game app 17. The present inventor anticipates that wearable 16 includes a haptic or kinesthetic device for the purposes of causing vibration sensations at key moments in board game 10, or perhaps when one group member is placing a radio call to another member. The wearable could also have a small display for displaying messages, symbols and any other information. As will be understood by those skilled in the art of displays, any technology such as an LCD, AMOLED, PMOLED, e-Ink or similar can be used to implement the anticipated display.

Figure 3:
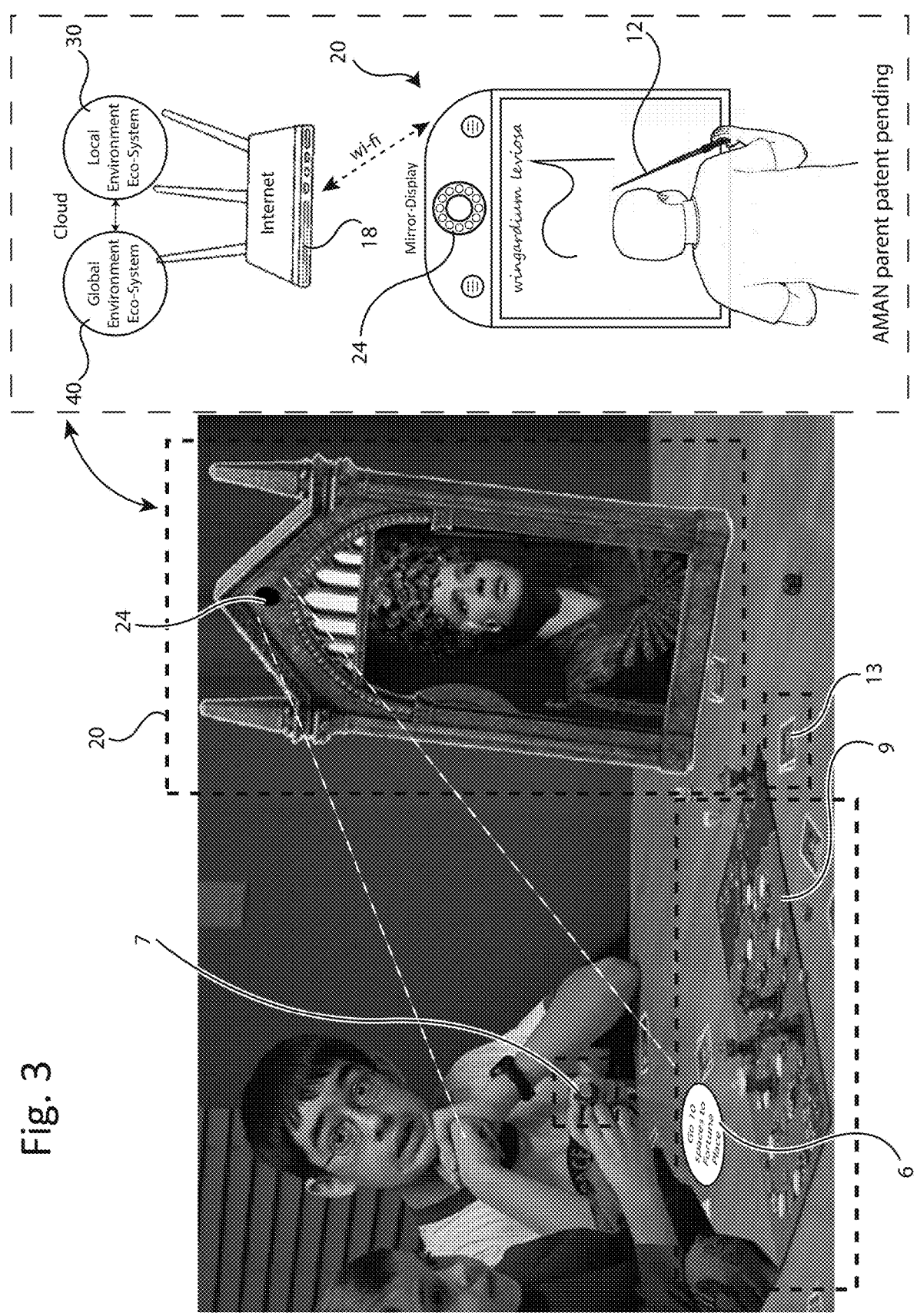
FIG. 3 is a combination pictorial representation and block diagram of alternate game board 9 that uses alternate collectible game pieces 7 as well as collectible game cards 13, and electronic turn device 6. Also shown is mirror-display 20 as first taught in the parent application from the present inventor. Mirror-display 20 is capable of scanning both game pieces 7 and game cards 13 for unique identification, where mirror-display 20 is connected to the internet 18 for accessing both the global environment eco-system 40 and local environment eco-system 30, and where mirror-display 20 uniquely responds to game pieces 7 and game cards 13 and communicates with game move selector 6.

Referring next to FIG. 3, there is shown a combination pictorial representation and block diagram of alternate game board 9 that uses alternate collectible game pieces 7 as well as collectible game cards 13 and electronic turn device 6. Also shown is mirror-display 20 as first taught in the parent application from the present inventor. Regarding alternative game board 9, the present inventor anticipates that a more traditional style game board without any game piece tracking electronic 10b and attendant data and power cable 10c, or game overlay 11, may still be useful and enjoyable with the remaining components or alternate components of physical-virtual game board and content delivery system 1. Like a traditional game board, players move game pieces 7 about the board 9. Unlike game board 10 that can automatically sense the location and unique identity of each game piece 8, content is recalled by system 1 using mirror-display 20, where mirror-display 20 was the main subject and teaching of the parent application and will not be discussed herein except in summary. Mirror-display 20, like computing device and game app 15 includes some form of a camera 24 that can be used to capture images and perform object recognition. Player 24 may present game piece 7 to the view of camera 24 for recognition in any of several possible ways, all of which will be well understood to those skilled in the art of image processing and object recognition and tracking. First, camera 24 may be capable of emitting IR light and then capturing the reflected IR light, all as described in the parent application. In this case, the present inventor anticipates that, for example, a unique IR code is affixed or marked onto the bottom of every game piece 7 and that ideally this marking is retro-reflective. When a player holds up the bottom of their game piece 7, the camera 24 that preferably is always on and processing images, recognizes the unique IR code that is then interpreted as the unique identity of the piece 7 and associated with the player. At this point, mirror-display 20 is capable of recalling content and information from connected eco-systems 40 and/or 30 as prior described for computing device and game app 15. Although the players in the present figure are intentionally depicted as not wearing glasses 14a or wearable 16 because system 1 has valuable and novel functions without these additional components, it is possible that alternate game board 9 can be played with glasses 14a for receiving secret messages from mirror-display 20. If the player is wearing wearable 16, then all of the same functions available to game board 10 are likewise available to game board 9, for instance the interactive beads 16b may be lit up by device 15 at any time determined by the game designer.

Still referring to FIG. 3, there are several ways for mirror-display to determine the unique location of game piece 7 on board 9, at least including: 1) registering all players and game pieces through a user interface on the mirror-display 20 prior to the start of the game, assuming that all players start at the beginning of the board game path of unique locations, using either electronic turn device 6 (to be described shortly) or a user interface on display 20 to choose, indicate, request, decide, etc. the amount of locations for a player to advance their piece 7, and then assuming or optionally confirming the location number, name, symbol or unique identifier that the player has placed their piece 7 upon, 2) placing the mirror-display 20 and therefore tracking camera 24 in such a position in relationship to game board 9 that camera 24 can accurately detect using image processing against a pre-known layout of game board 9 as well as pre-known images of pieces 7, where each game piece 7 is currently located, or 3) using a verbal or touch screen input on display-mirror 20 to allow the player to indicate the new location of their piece 7. The present inventor prefers the option (1) above that relies upon a novel electronic turn device 6, where turn device 6 minimally includes: 1) power, 2) wireless communication with mirror-display 20 that is preferably accomplished by WiFi or Bluetooth, 3) a computing element for executing turn determination algorithms and for operating a display, and 4) a display for providing visual instructions relating to the player's turn and therefore movements of piece 7. Electronic turn device 6 optionally includes any of LEDs, haptic feedback or audio output for providing additional forms of communication for example when indicating a special game event, game location or that a player has won the game. What is most important to see is that like game board 10, game board 9 can also ultimately know each the movements of each player's game piece 7 upon game board 9 and therefore like computing device and game app 15, mirror-display 20 can recall content and information according to the intent of the game designer, track and report the progress of the game to eco-system 40 and/or 30, and otherwise perform all of the same useful functions as described in relation to FIG. 1 and game board 10. This includes the use of game cards 13 in a similar fashion as previously described herein.

Referring still to FIG. 3, there is shown article 12, such as a wizard's wand, being moved about in front of mirror-display 20, for which the parent application has significant teachings. One of the novel functions taught in the parent application regarding tracking of at least the wand tip, was the display of wand tip paths upon the mirror-display 20. Mirror-display 20 was also then capable of interpreting these paths as spells, or commands. Regarding the present teachings, it is anticipated that a player using an article 12 such as a wand will use indications, gestures, spells, or similar for several purposes with respect to a particular board game 9, (or even board game 10 where mirror-display 20 is being used with or in place of computing device and game app 15.) These several purposes include, but are not limited to: 1) a user interface for a player to choose, indicate, request, decide, etc. the amount of locations for a player to advance their piece 7, in replacement of or conjunction with electronic turn device 6, 2) a user interface for answering challenges, performing actions, or otherwise responding to the game instructions as intended by the game designer, 3) requesting additional content or information from eco-system 40 and/or 30, and 4) engaging in duals or competitions with other players playing the same game at some other location remote from the player. Especially for the last purpose of distributed multi-player game play and activity, similar to the cameras anticipated for computing device and game app 15, mobile device and game app 17 and active glasses 14a, the camera 24 on display-mirror 20 may also be used to provide real-time video (as well as audio using the embedded microphone as described in the parent application) of the various players as they engage in a distributed game.

And finally, with respect to FIGS. 1, 2a, 2b and 3, many combinations of the preferred, alternative and optional components described herein, as well as adaptations that will be obvious based upon a careful reading of the present invention and parent application and an understanding of gaming systems, are possible without departing from the teachings and scope of the present invention. For instance, game board 10 can be used with mirror-display 20, where display 20 is further adapted to allow the connection of data and power cable 10c, or game board 10 is further adapted to support wireless communication such as Bluetooth. In this capacity, mirror-display 20 may fully replace the functions of computing device and game app 15, for example by including the same game app or similar, or may combine with the use of device 15, for example where display-mirror 20 is used for the article 12 user interface. Similarly, computing device and game app 15 may be used with game board 9, communicating with electronic turn device 6 or providing an equivalent user interface via the game app, or using the game app on one or more mobile devices with game app 17. Therefore, it is to be understood that the many and various components described herein should be construed as exemplifications and not limitations of the present invention. What is most important is that an entity's eco-systems 40 and/or 30 are connected to the board game 9 or 10 experience and capable of both providing content and information and receiving the on-going status of the board game and player achievements. It is also important to see that this configuration combines the traditional physical board games with newer virtual computer games. It is further important to see how system 1 supports a means for entities to further engage and entertain their customers before, during and after visits.

Figure 4:
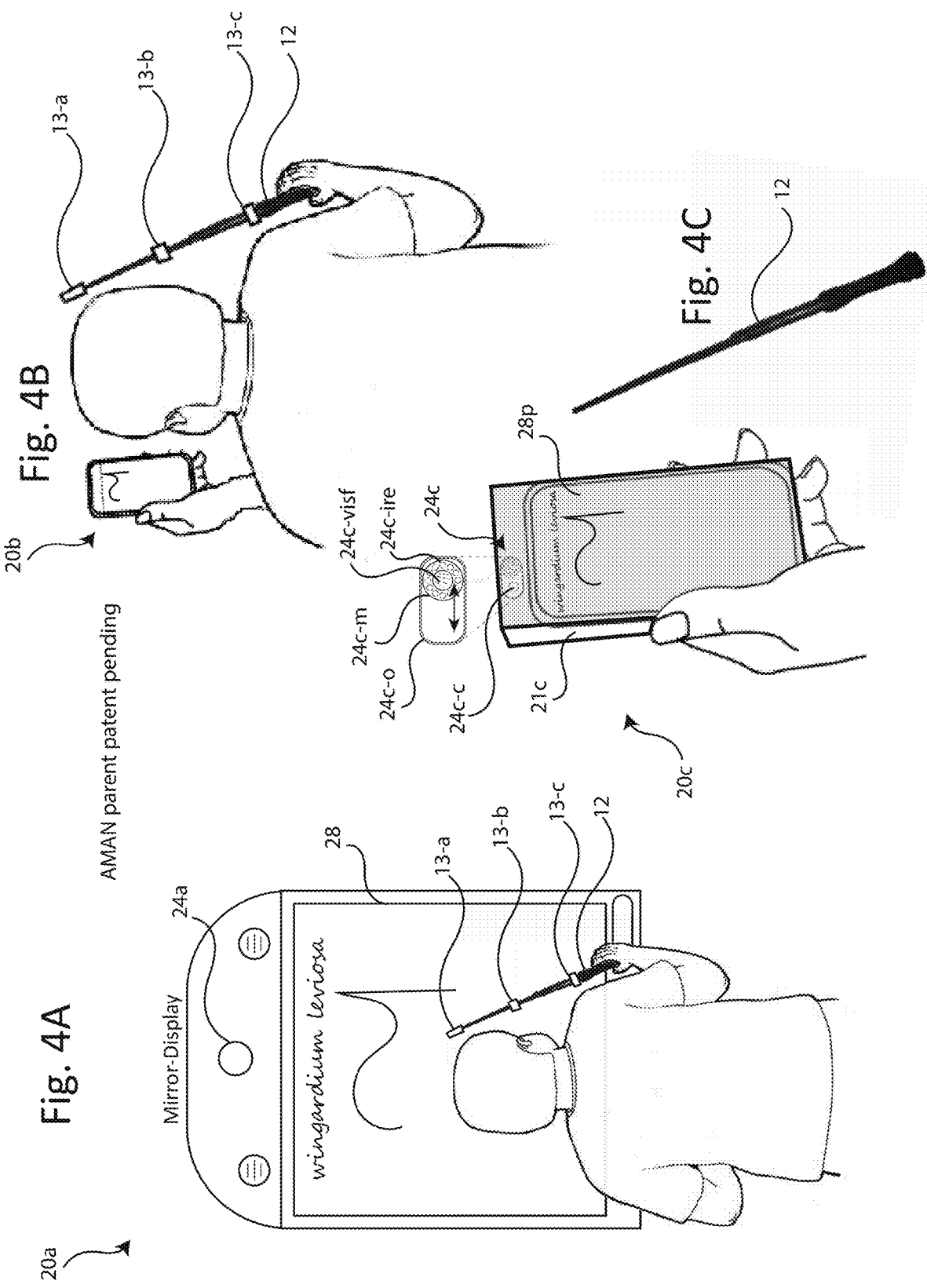
FIG. 4*a* is an alternate embodiment mirror-display 20*a* comprising a lower cost object tracking system 24*a* that is only capable of capturing visible light images, and a lower cost passive transflective layer, all as first taught in the parent application from the present inventor. Also shown are visible markers 13-*a*, 13-*b* and 13-*c* for adhering to article 12 providing trackable points for system 24*a*.
FIG. 4*b* is an alternate embodiment mirror-display 20*b* comprising a mobile device such as a cell phone running a special app for causing the cell phone to mimic alternate mirror-display 20, all as first taught in the parent application from the present inventor.
FIG. 4*c* is an alternate embodiment mirror-display 20*c*, that is further adapted from alternate 20*b* (that tracks article 12 in visible light) to allow the cell phone and app to track article 12 using IR light. Alternate display 20*c* includes case 21*c* with opening 24*c-o* that exposes cell phone camera 24*c-c*, where mount 24*c-m* is movable within opening 24*c-o* so as to cause visible light filter 24*c*-visf and IR LEDs 24*c*-ire to optionally cover cell, all as first taught in the parent application from the present inventor.

Referring next to FIG. 4a, there is shown an alternate embodiment mirror-display 20a comprising a lower cost object tracking system 24a that is only capable of capturing visible light images, and a lower cost passive transflective layer, all as first taught in the parent application from the present inventor. The purpose of this lower cost alternate embodiment 20a included addressing the home market, a market that coincides with board game 10 and alternate board game 9 of the present system 1. The prior parent application described the apparatus, operation and advantages of alternate mirror-display 20a in detail, which will not be repeated herein. What is most important to understand with respect to the present invention is that alternate mirror-display 20a is capable of tracking an article 12, such as a wizard's wand, using a visible light only camera 24a, rather than camera 24 that was taught as relying upon emitted and received IR tracking energy for reflecting off and detecting points on article 12 such as the tip of a wizard's wand. (Note that the parent application also taught that camera 24 could additionally capture visible light images, where these images have many uses including the sharing of player video as discussed in relation to prior FIG. 3 in relation to camera 24 on mirror-display 20.) The parent application teaches adhering visible markers 13-a, 13-b and 13-c to article 12 providing trackable points for system 24a, all as will be well understood by those familiar with object tracking and from a careful reading of the parent application. The present teachings incorporate mirror-display 20 and alternate mirror-display 20a as a component of system 1. Furthermore, as will also be well understood by those skilled with vision systems and object tracking, the same article 12 with one or more attached visible markers 13-a, 13-b and 13-c may also be tracked by object tracking algorithms running on computing device and gam app 15, thus this main concept of marking the article 12 for either 2DoF or 6DoF tracking (see parent application) is useful with device 15 and therefore system 1, without requiring the component mirror-display 20 or 20a.

Referring next to FIG. 4b, there is shown alternate embodiment mirror-display 20b comprising a mobile device such as a cell phone running a special app for causing the cell phone to mimic alternate mirror-display 20, all as first taught in the parent application from the present inventor. The purpose of this alternate embodiment of mirror-display 20 as a cell phone and app 20b, is to provide the individual with a portable and personal device for practicing article 12

(e.g. wizard's wand) movements (e.g. spells), and for then also using cell phone and game app 20*b* as an portal, or interface into the information and content managed by eco-systems 40 and/or 30. The prior parent application described the apparatus, operation and advantages of alternate mirror-display 20*b* in detail, which will not be repeated herein. What is most important to understand with respect to the present invention is that alternate mirror-display 20*a* is capable of functioning as mobile device and game app 17 as described in relation to FIG. 1, therefore providing all of the prior described functions and benefits, while now also allowing for object tracking using visible light in either 2DoF or 6DoF of an article 12, such as a wizard's wand. As prior discussed in relation to FIG. 3, such an upgraded game app that can recognize and respond to article 12 movements, gestures, indications, etc. contributes to the enjoyable gaming possibilities for the players of game board 9 or 10 of system 1.

Referring next to FIG. 4*c*, there is shown an alternate embodiment mirror-display 20*c*, that is further adapted from alternate 20*b*, where 20*c* is capable of tracking article 12 using IR energies. Alternate mirror-display 20*c* includes case 21*c* with opening 24*c*-*o* that exposes cell phone camera 24*c*-*c*, where mount 24*c*-*m* is movable within opening 24*c*-*o* so as to cause visible light filter 24*c*-visf and IR LEDs 24*c*-ire to optionally cover and surround camera 24*c* respectively, all as first taught in the parent application from the present inventor. What is most important to understand with respect to the present invention is that alternate mirror-display 20*c* is capable of functioning as mobile device and game app 17 as described in relation to FIG. 1, therefore providing all of the prior described functions and benefits, while now also allowing for object tracking using IR energy in either 2DoF or 6DoF of an article 12 such as an official Harry Potter Wand. As prior discussed in relation to FIG. 3, such an upgraded game app that can recognize and respond to article 12 movements, gestures, indications, etc. contributes to the enjoyable gaming possibilities for the players of game board 9 or 10 of system 1.

Figure 5:
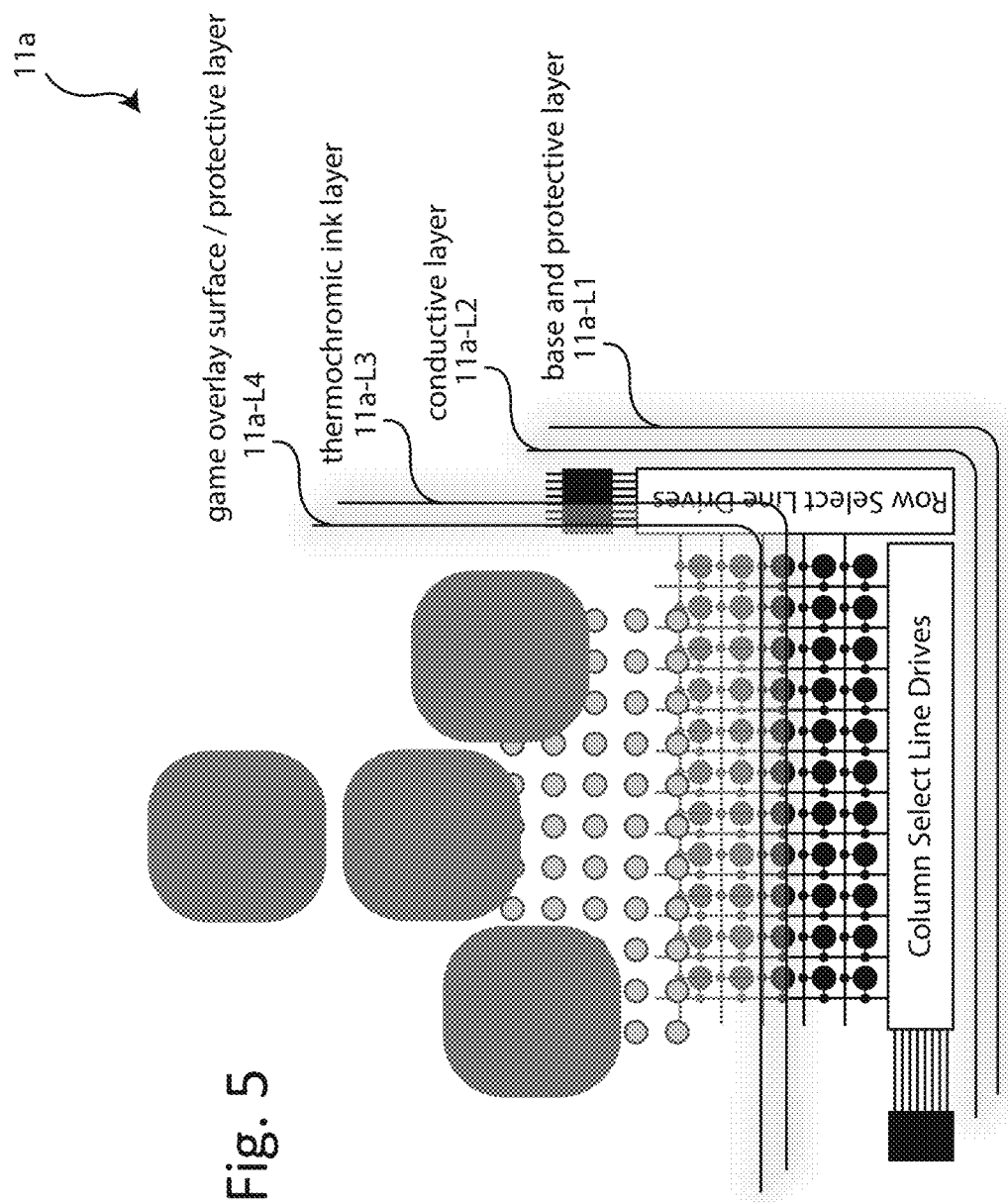
FIG. 5 is a top view conceptual diagram of an alternative game overlay 11*a* with electronically switchable surface content, where alternative overlay 11*a* comprises multiple layers such as a base and protective layer encasing the electronics and thermochromic inks, a conductive layer 11*a*-L2 with electronics for controllably heating thermochromic ink, a thermochromic ink layer 11*a*-L3 comprising a matrix or arrangement of thermochromic ink that transforms in color when heat is applied, as well as a game overlay surface/protective layer 11*a*-L4 that is the visual top surface of alternative game overlay 11*a* and comprises similar game board printed graphics as game board overlay 11 that is visually apparent to the players.

Referring next to FIG. 5, there is shown a top view conceptual diagram of an alternative game overlay 11*a* with electronically switchable graphics. Like game overlay 11, alternate overlay 11*a* includes printed graphics and designs on surface layer 11*a*-L4 indicative of the game board layout, including multiple marked spaces or locations for denoting the movements of game pieces. Where game overlay 11 can be printed as a single sheet of paper, alternative game overlay 11*a* is a multi-layer composition that is also anticipated to be flexible similar to paper and relatively low cost to produce. What is especially different and useful about alternate game overlay 11*a* is that overlay 11*a* has the ability to controllably augment the visual presentation of the printed surface graphics and designs on surface layer 11*a*-L4 so as to alter the visual perception of the game board layout. Some anticipated alterations to the visible printed surface game board design is to show a secret word, or open a secret door or secret path of additional marked piece locations. Other alterations will be obvious to those skilled in the art of physical game boards and game concepts. For example, in one use, as the players move about the game board 10, receiving points, performing tasks such as answering questions or doing assignments (see FIG. 7,) it is possible for the game designer to use at least any of the ongoing game database information (that includes at least the current if not also the history of each game piece 8 and therefore player's movements,) such that triggered by a game piece 8 movement or any other trigger preferably based at least in part upon any of game database information, the game board electronics 10*b* causes an electric field that then causes the game overlay electro-chromic surface to change color, thus revealing and or removing surface indications such as a marked location or path for game piece 8 movement.

Still referring to FIG. 5, in response to a particular player's roll, spin, answer, gesture, etc., the computing device and game app 15 may send electronic signals through data and power cable 10*c* (or its wireless equivalent,) where these signals and power are directed from game base 10*a* and electronics 10*b* to contacts on conductive layer 11*a*-L2. As will be well understood by those skilled in the art of electronics and especially printed electronics as well as short range power and signal transfer including inductive coupling or capacitive coupling, there are multiple possibilities for transferring power and control signals to conductive layer 11*a*-L2, including short range remote power and signal transfer or exposing the contacts of conductive layer 11*a*-L2 through base and protective layer 11*a*-L1 so as to form a physical contact and signal transfer link with game electronics 10*b*. What is most important to understand is that by transferring power and control signals to conductive layer 11*a*-L2, it is possible to uniquely address (and in so doing heat up) one or more heat sinks arranged for example in an addressable matrix of uniformly spaced dots. Multiple arrangements of the thermochromic comprising ink layer 11*a*-L3 are possible, where each heat sink in layer 11*a*-L2 is shaped and aligned underneath a specific shape and color of thermochromic ink. Such electronically switchable inks are well known in the marketplace and for instance can be purchased from companies such as LCRHallcrest that also produces conductive circuits with thermographic display similar to alternate game overlay 11*a*. Thermochromic inks are well known to change color with applied heat and then to return to an original state when the heat source is removed.

Still referring to FIG. 5, forming an alternative game overlay using thermographic display technology is preferred because of its cost and performance benefits. However, other technologies are available including electroluminescent inks that respond to electric current by emitting light and changing opacity. As is well known in the art, electroluminescent inks can be silk-screened onto plastic sheets and then electronically altered by the application of an electric field. One preferred source for what is known as electrochromic displays, that can be printed as a flexible surface on plastic or paper is a European company called "ynvisible." They refer to their products as "printed electrochromics" that can be printed onto paper or plastics (which are both a preferably material for game overlay 11.) They are flexible, ultra-low weight and require very little power. The present inventor notes that these same printed electronics can also include sensors such as a touch sensor or heat sensor. The present inventor further anticipates including such sensors into the game overlay 11 as a means of accepting input from the players, for example to answer questions or causing a virtual spinner or dice to be spun or thrown on the game app 15 UI by pushing a location on the game overlay surface.

Figure 6:
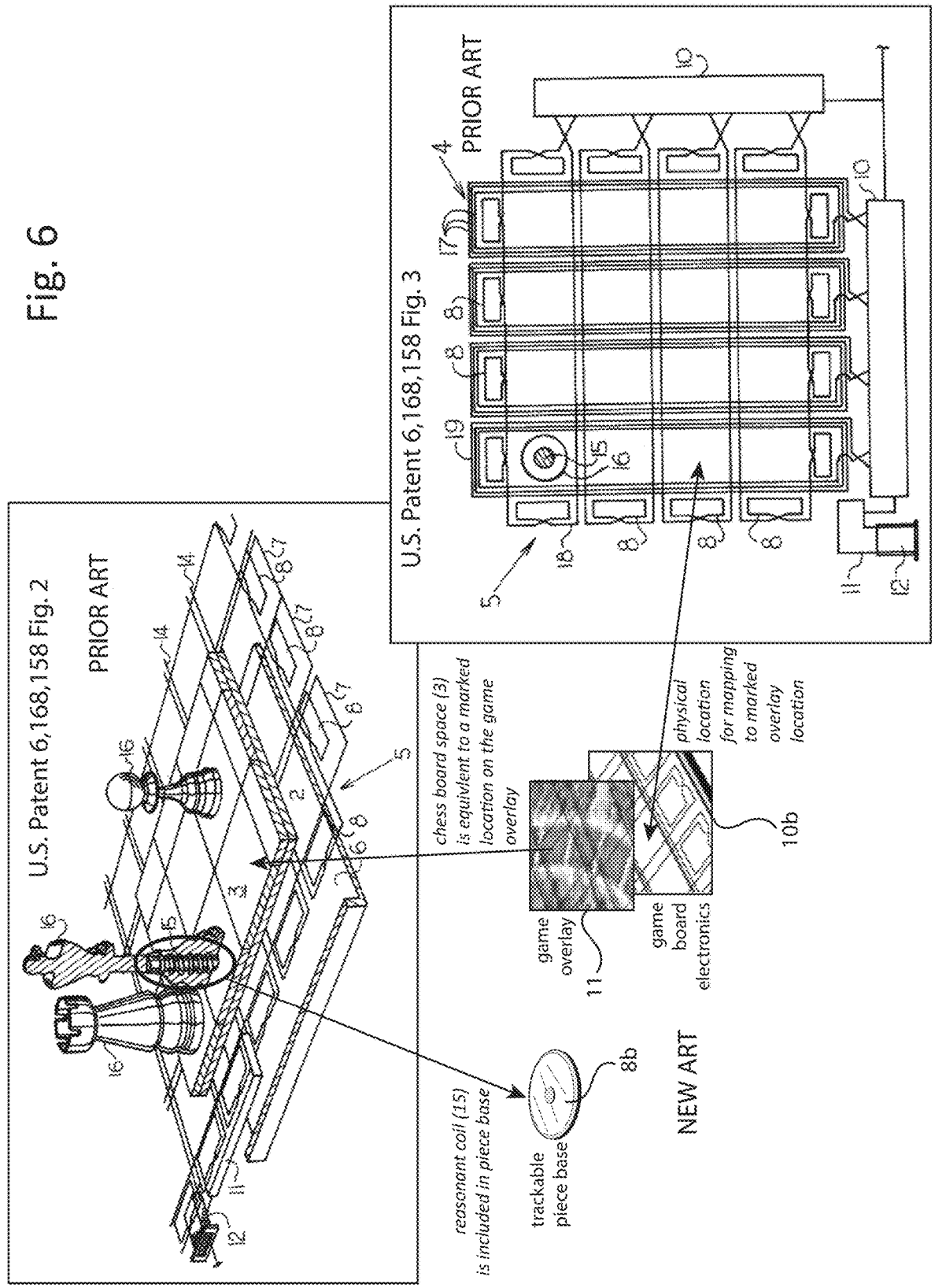
FIG. 6 provides two figures (FIG. 2 and FIG. 3) from PRIOR ART U.S. Pat. No. 6,168,158 that is herein incorporated by reference. Included with the two PRIOR ART figures are the NEW ART of the present invention including trackable game base 8*b*, game overlay 11 with marked locations (similar to chess board locations such as 3 in the PRIOR ART FIG. 2,) and game board electronics 10*b* that includes a multiplicity of tracked physical locations using the tracking matrix of send and receive coils as taught in the PRIOR ART (see FIG. 3.)

Referring next to FIG. 6, there is shown inventor Bulsink's PRIOR ART FIG. 2 and FIG. 3 from U.S. Pat. No. 6,168,158 that is incorporated by reference into the present application. Bulsink teaches a game board divided into discrete squares (such as element 3 in PRIOR ART FIG. 2) and (game) pieces (such as 16 in PRIOR ART FIG. 2) of differing types for placing on the squares. Included within Bulsink's game pieces is a resonant coil (element 15 in PRIOR ART FIG. 2,) where the resonant coil is uniquely detectable by conducting a scanning process using a layer of receive coils (element 4 of PRIOR ART FIG. 3) in sequence with a layer of transmit coils (element 5 of PRIOR ART FIG. 3.) "When a playing piece is situated above both the selected transmit coil and the selected receive coil a resonance signal is generated." Electronic means are also provided then correlate the generated resonance signal with a physical location (such as 3 in PRIOR ART FIG. 2) and a game piece "type," where for the purposes of the present invention the game piece type is an identification code (where 2 or more game base's 8b have the same code) or unique identification code (where one 1 game base 8b has the code for any given game play.)

The present invention has many advantages over the PRIOR ART of U.S. Pat. No. 6,168,158 especially including that the "logical" layout of marked locations on the game overlay 11 surface is separate from the "physical" layout of the physical locations as embedded in the game board electronics 10b. By allowing for any number of different game overlay 11 surfaces that are usable on a single game board electronics 10b, the present invention teaches a never-ending game surface that is low cost to provide to the consumer. By connecting the game board 10 to a computing device 15 running a gaming app and preferably connected to an entity's eco-system such as 40 or 30, it is then possible to interactively provide content and information from the entity to the game players in real-time for additional enjoyment based at least in part upon the automatically detected on-going locations of game pieces 8. Many other advantages are also described herein and will be apparent from a careful reading of the specification and claims.

Figure 7:
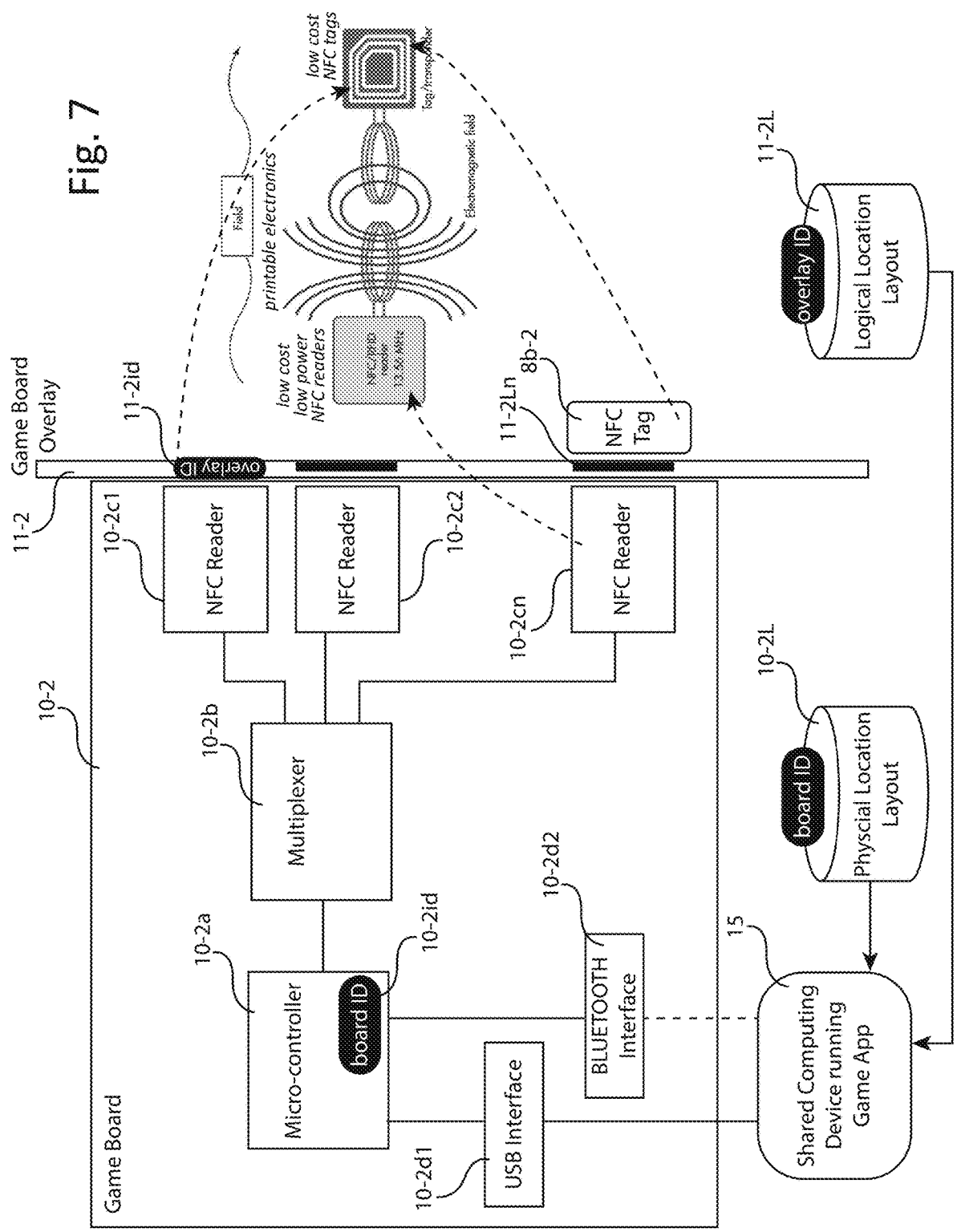
FIG. 7 depicts an alternative game board 10-2 and game board overlay 11-2 that employs NFC (near field communications) to implement both physical locations, such as 10-2*c*1, 10-2*c*2 and 10-2*cn* as individual addressable NFC readers that are polled by a combination of a microcontroller and multiplexer, and game piece bases 8*b*-2 as NFC tags.

Referring next to FIG. 7, there is shown an alternative game board 10-2 and game board overlay 11-2 that employs NFC (near field communications) to implement both physical locations, such as 10-2c1, 10-2c2 and 10-2cn as individual addressable NFC readers, and game piece bases 8b-2 as NFC tags. Game board 10-2 preferably comprises a computing element such as micro-controller 10-2a to control all internal electronic parts and to communicate with the game app running on the shared computing device 15, where communication means preferably include either or both of a wire means such as USB interface 10-2d1 or a wireless interface such as Bluetooth interface 10-2d2. Computing element 10-2a preferably uses a multiplexer 10-2b to interface with the multiplicity of NFC readers such as 10-2c1, 10-2c2 and 10-2cn, where preferably the multiplicity of NFC readers forms a regular matrix of physical locations at the surface of the game board 10-2 that interfaces with the game board overlay 11-2. As is well known in the art, each NFC reader is capable of remote coupling and reading information from an NFC tag at short ranges typically <10 cm. It is then preferred that each game piece base 8b-2 comprise at least one NFC tag such that as the piece base 8b-2 in placed over and upon a marked logical location such as 11-2Ln as demarcated on board overlay 11-2, the NFC tag comes into the proximity of an NFC reader such as 10-2cn. It is also preferred that computing element 10-2a regularly scans the matrix of NFC readers to determine if any NFC tags such as for example comprised within game base 8b-2 are currently detectable in the proximity of any given NFC reader situated over potential logical game overlay locations, such as 10-2c2 and 10-2cn.

Still referring to FIG. 7, game board computing element 10-2a preferably provides a unique game board ID 10-2id as digital information to game app and computing element 15. It is also preferred that any game overlay such as 11-2 further includes an embedded NFC tag comprising a game overlay ID 11-2-id that will align with a pre-known physical location such as 10-2c1, whereby computing element 10-2a causes this pre-known physical location NFC reader 10-2c1 to read the game overlay's unique ID 11-2id prior to the commencement of the game. Using the combination of the game board ID 10-2id and the game board overlay ID 11-2id, game app 15 retrieves game board layout information 10-2L and game overlay layout information 11-2L all as prior described. As also prior described, game app 15 is then capable of mapping physical locations such as 10-2cn to a logical location 11-2Ln such that the specific game piece base such as 8b-2 can be designated to be located at a specific location on the game overlay 11-2, such as 11-2Ln. As will be appreciated by those skilled in the art of printed electronics, companies such as Thinfilm are now producing or will soon be producing very low-cost tags in the expected price range of $0.10 each, and several companies such as NXP manufacture NFC controllers in the price range of $2.0 each, all of which facilitate producing a low cost game board 10-2 with a controlled matrix of NFC readers as well as game overlays 11-2 with an embedded NFC tag for unique identification 11-2id and plastic bases 8b-2 comprising an NFC tag. As will also be appreciated, using NFC technology, it is possible to embed a much larger number of unique piece base ID's 8b-2 that using the Bulsink prior art apparatus.

Figure 8:
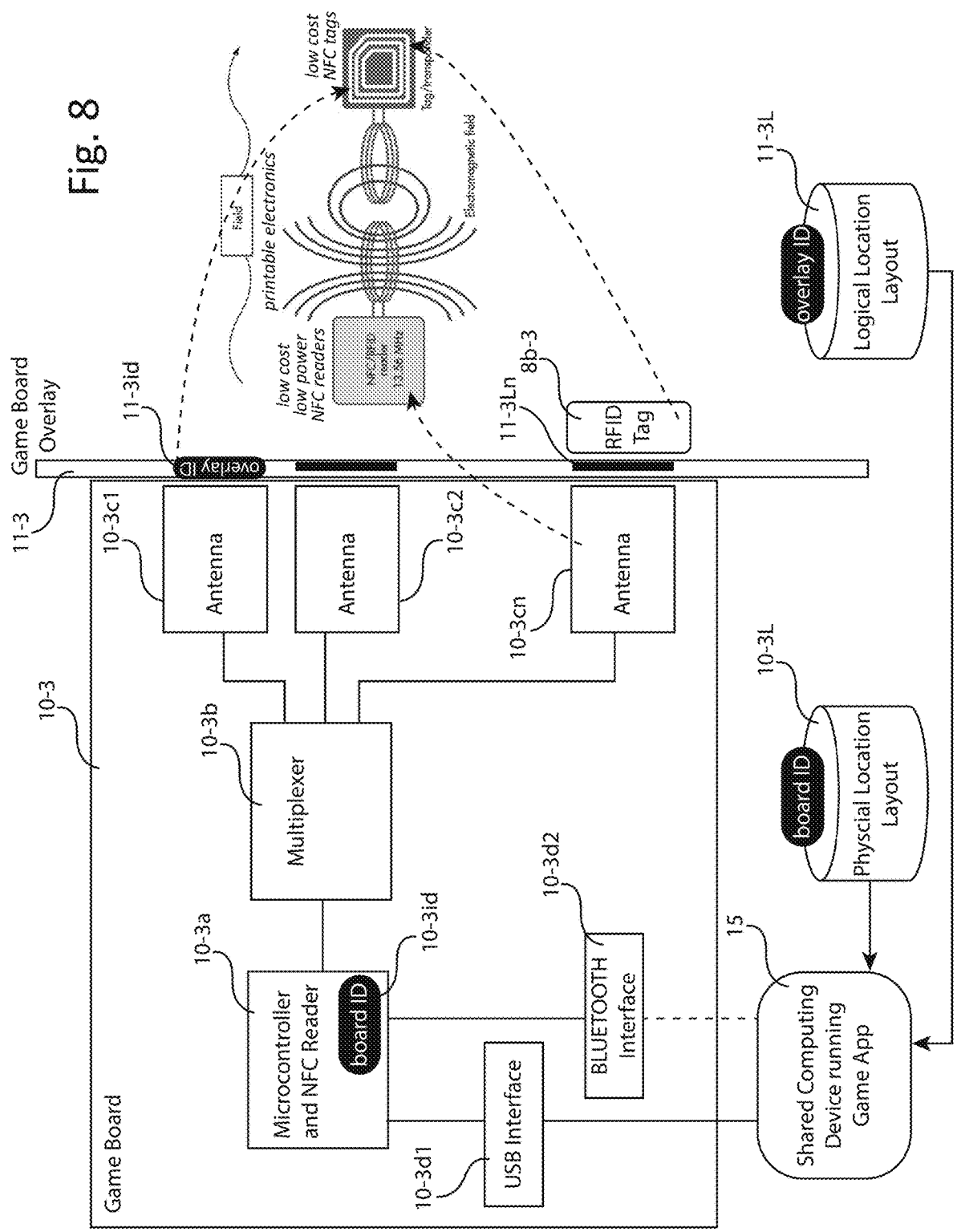
FIG. 8 depicts an alternative game board 10-3 and game board overlay 11-3 where the combination of the microcontroller and multiplexer connect at least one NFC reader to multiple antenna, thus saving on the cost of NFC readers where the antennas can be produced using lower cost printable electronics. Physical locations, such as 10-3*c*1, 10-3*c*2 and 10-3*cn* are implemented as individual addressable NFC antennas, and game piece bases 8*b*-3 are implemented as NFC tags.

Referring next to FIG. 8, there is shown an alternative game board 10-3 and game board overlay 11-3 that employs one or more NFC readers shared to read two or more antennas, where the individual addressable antennas represent the physical locations, such as 10-3c1, 10-3c2 and 10-3cn, and where game piece bases 8b-3 are implemented using NFC tags. Game board 10-3 preferably comprises a computing element 103-a comprising a microcontroller to control all internal electronic parts and to communicate with the game app running on the shared computing device 15, where communication means preferably include either or both of a wire means such as USB interface 10-3d1 or a wireless interface such as Bluetooth interface 10-3d2. The microcontroller of computing element 10-3a preferably controls one or more NFC readers, connecting each NFC reader to one or more antenna such as 10-3c1, 10-3c2 and 10-3cn using a multiplexer. The multiplicity of antennas forms a regular matrix of physical locations at the surface of the game board 10-3 that interfaces with the game board overlay 11-3. As is well known in the art, a controlled by NFC reader 10-3a connected to an antenna is capable of remote coupling and reading information from an NFC tag. It is preferred that each game piece base 8b-3 comprise at least one NFC tag such that as the piece base 8b-3 in placed over and upon a marked logical location such as 11-3Ln as demarcated on board overlay 11-3, the NFC tag comes into the proximity of an antenna such as 10-3cn. It is also preferred that micro-controller-multiplexer and NFC reader 10-3a regularly scans the matrix of antennas such as 10-3c1, 10-3c2 and 10-3cn to determine if any NFC tags such as for example comprised within game base 8b-3 are currently detectable in the proximity of any given antenna situated over potential logical game overlay locations, such as 10-3c2 and 10-3cn.

Still referring to FIG. 8, the microcontroller of computing element 10-3a preferably provides a unique game board ID 10-3id as digital information to game app and computing element 15. It is also preferred that any game overlay such as 11-3 further includes an embedded NFC tag comprising a game overlay ID 11-3-id that will align with a pre-known physical location such as 10-3c1, whereby NFC reader 10-3a causes this pre-known physical location antenna 10-3c1 to read the game overlay's unique ID 11-3id prior to the commencement of the game. Using the combination of the game board ID 10-3id and the game board overlay ID 11-3id, game app 15 retrieves game board layout information 10-3L and game overlay layout information 11-3L all as prior described. As also prior described, game app 15 is then capable of mapping physical locations such as 10-3cn to a logical location 11-3Ln such that the specific game piece base such as 8b-3 can be designated to be located at a specific location on the game overlay 11-3, such as 11-3Ln.

As will be appreciated by those skilled in the art of NFC and RFID systems as well as printed electronics, there are many companies now producing very low-cost NFC readers, antennas and tags, all of which facilitate producing a low cost game board 10-3 with a controlled matrix of antennas operably connected to one or more NFC readers comprised within computing element 10-3a as well as low cost game overlays 11-3 with an embedded NFC tag for unique identification 11-3id and game bases 8b-3 comprising an NFC tag. As will also be appreciated, using either the preferred short-range NFC technology, or otherwise a similar RFID reader-antenna technology, it is possible to embed a much larger number of unique piece base ID's 8b-3 that using the Bulsink prior art apparatus. While NFC readers are preferred over RFID readers based at least upon reduced cost, companies such as MindSportInternational are currently providing game boards for playing specific games such as Scrabble, Chess and Go, where the game board uses multiple RFID readers to poll a multiplicity of RFID antennas to locate game pieces with embedded RFID's placed over a location comprising an antenna. Either of the sort-range NFC or longer-range RFID technologies are acceptable for use in implementations of game board and game piece as described in FIGS. 7 and 8.

As will also be clear, game cards 13 can be embedded with either an NFC or RFID tag as opposed to using a printed bar code such as 13qr, where it is preferred to use and NFC tag since most cell phones include and NFC reader and then can also be used to include a game app interface 17, where the player scan the card with the cell phone NFC reader and then receives their private message, content, instructions, etc., or this same information is shown to all players on the shared device 15.

CONCLUSION AND RAMIFICATIONS

Thus the reader will see that the present invention accomplishes the convergence of multiple forms of recreation including physical board games and virtual board games, where continuously updated content associated with entities including theme parks, movies, cable shows, books, museums, schools, organizations, etc. my be presented to the players in multiple replaceable physical and virtual forms including game board overlays, collectible figurine pieces, game cards, as well as evergreen and personalized information and content. The present system provides novel means for entities representing national and international brands to engage, intrigue and entertain customers using the herein described physical and virtual formats that are both low cost to efficiently distributed. The present system provides novel means for these same entities to gather information from their customers and prospective customers relating to their choices and responses indicated while participating in the gaming system 1.

The present invention is further anticipated to be useful in a school environment, where it is advantageous to combine game playing with learning. There exist companies in the marketplace such as MysteryScience that already create and market physical and virtual experiences for teaching science lessons. Systems such as those created by MysteryScience would benefit by incorporating their lessons into a companion everchanging board game such as herein described, including students receiving collectible tokens, badges, items, rewards etc. representative of the achieved lessons. The present system also allows a means for multiple schools to compete on-going, throughout a school year, where again all the main physical and virtual components can be upgraded at low cost with efficient distribution. Schools are expected to have color printers and many also have 3D printers such that the physical game pieces such as overlays 11, game cards 13 and game piece figurines 8b may all be produced locally as distributed with lesson plans.

The present inventor also anticipates that the National Parks system would benefit by making games representative of each of the Nation's Parks, such that players can enjoy playing and interacting with current park information and content as they traverse the park layout using various printed overlays 11 that essentially serve as maps. The present inventor described a use with television or cable shows that feature on-going stories, where the producers of these shows can benefit from engaging their viewer base with an ever-changing board game that follows along with the upcoming episodes. In this example, players are incentivized to play along in advance and to accumulate points in a MMO (massively multi-player) style game based upon their ability to correctly predict the choices their favorite characters will make in the next show. Rating companies such as Nielsen can benefit from the information gathered by system 1 as it relates to players making choices crafted to reveal preferences and concerns related to products. System 1 also provides continuous means for advertisers to promote their products in novel ways. The present inventor also anticipates that fan-clubs or social groups can also form websites for uploading and distributing game overlays, game cards, virtual content, game rules, 3D printer files for figurines etc. which then form an open-game marketplace for experimenting with new ideas.

The present invention has taught various alternatives for providing a game board that tracks the physical locations of a game piece, including the use of the Bulsink's scanning for a resonance signal technique or MindSportsInternational RF scanning for tags technique. There are many differences between the present invention and the solutions of Bulsink and MindSportsInternational as will be apparent from a careful reading of the present invention as compared to the references, with a first major difference being the present invention's solution for providing multiple logical surfaces such as 11, 11-2 and 11-3 that are digitally mappable by the game app and computing device 15 to the same physical game board such as 10, 10-2 and 10-3 respectively. This novel feature allows a single game board such as 10, 10-2 and 10-3 to service a never-ending set of overlays 11, 11-2 and 11-3 respectively, for providing on-going extensions to a single game, or for providing multiple games, where the overlays are significantly lower in cost (in the range of paper) and therefore throwaway and can be printed locally by the game players. For example, the technologies for building any of game boards 10, 10-2 or 10-3 are low cost enough in large quantities that it is possible for an entity such as a theme park, museum consortium, travel support agency, movie or show producer or provide the game boards at no cost to players as an enticement to participate. The entity then establishes a global eco-system 40 for maintaining both the game structures including rules and game database as well as all content. Since the game overlays 11, 11-2 and 11-3 can be made from 100% paper (in which case the overlays preferably use a bar-code 11*qr* for identification rather than either an NFC or RFID tag,) it is then possible for the entity's global eco-system to transmit the game overlay designs for example to a UPS store local to the player, where the UPS store then prints a game overlay (presumably in a larger format than 8.5"×11" which the player could most likely print for themselves,) and then mails the one or more game overlays to the player, thus providing the overlays at a low cost as well.

Using this ability to extend a single game into an unlimited number of new "instances" i.e. surfaces 11, 11-2 or 11-3, it is possible to play entirely new types of physical-virtual board games, for example a world travel game. In this game, using a game board such as 10, 10-2 or 10-3, a person planning a trip to Europe from America can receive multiple overlays of the major cities, museums, cruise ships, hotels, etc. that they are anticipating visiting or staying at. As they play the game, they are connected to a remote server (therefore being a global eco-system 40) for a travel support entity that provides up-to-date travel information as the players move from logical to logical location on the provided game overlays such as 11, 11-2 and 11-3, respectively. This type of game allows providers of content such as travel books to merge their content in with a game. Other establishments such as restaurants, museums, theaters, specialty shops, etc. can contract with the travel support entity to purchase a location on a virtual game board and provide content including promotional rewards, incentives, discounts, etc. It is even possible that the travel entity provides the game in combination with other brands, where for example the game is a "Dan Brown" or "Indiana Jones" style hunt for clues across the globe. As those familiar with travel information, booking and planning will see, this solution has significant benefits as it provides an entirely new way of engaging with prospects and customers.

In another example, a casino is the entity and maintains a local eco-system 30 on-site. The casino then provides a game board to each hotel room and guests can visit the concierge to pick up overlays for the hotel itself (i.e. shops, restaurants, game machines and table locations, etc.) as well as the surrounding area (i.e. "things to do and see" during your visit.) The casino can even provide overlays designed to teach game play for any of the games they provide at their casino or to create new games that allow multiple players throughout the casino to compete each using their own game board in their own location, where the on-going results can be made available electronically in any number of means.

In another example, a theme park such as Universal Studios or Disney World provides free game boards to any family signing up for a vacation at least six months in advance. The theme park then establishes a global eco-system 40 and provides overlays that teach the families the park layouts, provide games based upon that entities core themes (such as Harry Potter or Star Wars, respectively,) and in general begin to more deeply engage their customers. The more the families play the game, the higher and higher levels they reach meaning new game overlays, wherein they can receive more and more benefits. These same basic strategies and uses can be extended to education where a single game board is reusable with an unlimited number of new overlays for different curriculum and lessons from a global 40 or local entity 30 along with matching content and information. Students can compete in games across classrooms, schools, school districts and even states. Parent can purchase game boards at home and play with their children to learn the materials and to provide help, where a parent's game piece might then trigger the provision by the system of different content and information as opposed to a student's game piece.

While the present system refers to global 40 and local 30 eco-systems and teaches their many features and advantages in the parent application of which the present invention is a continuation-in-part, it will be clear that multiple solutions are possible for providing shared gaming and content databases capable of supporting the present invention that do not include any one or more of the other features of the eco-systems 30 and 40 as discussed in the parent application. What is most important to see is that a remote database services multiple on-going games across multiple never-ending layers being used by a multiplicity of players. As will also be clear to those familiar with sales and marketing, the present system offers entities novel ways for conducting market research, especially including providing slightly different "A/B" content, information, incentives, etc., or slighting different "A/B" game overlays to different players or types of players, where the game play of these different players is then analyzed to provide valuable brand insights. It is also possible to ask questions with slighting different wording and then to judge this impact on the game play or player's game choices. Those familiar with market research conducted via web-sites such as Amazon or Google, will already be familiar with this type of technique that provides slightly different web-pages (functioning like a game overlay layout) or slightly different content to then judge the effect on the web-site visitors.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A physical-virtual board game platform for deepening the engagement of a person with an entity, comprising:
   a remote game play database maintained by, for, or otherwise in relationship to the entity, where the remote entity game play database comprises person identifying data and resulting game play data, where the resulting game play data is determined at least in part from current game play data determined during two or more sessions of game play conducted by the person using an interactive game board;
   the interactive game board for use by the person to conduct the two or more sessions of game play, where the interactive game board is in communications with the remote database, where the interactive game board uses one or more game pieces each comprising game piece identifying data, and where the interactive game board tracks a current location of the one or more identifiable game pieces being moved about on the interactive game board during game play, and where for each of the two or more sessions of game play the interactive game board determines current game play data comprising:
      data associating the remote person identifying data with the current game piece identifying data of at least one of the one or more game pieces being used by the person for conducting a current session of game play;
      the current location of the person's associated one or more game pieces on the interactive game board;
      other current game play data provided to the remote entity game play database as resulting game play data in relation to the person comprising any one of or any combination of accumulated game play, awarded points, achievements, and accumulated scores, where accumulated game play includes information provided by players in response to game clues, questions, messages, and other communications, and game experience provision means for receiving, retrieving, determining, or otherwise providing at least one engagement experience to the person, where the engagement experience is selected based at least in part upon any one of or any combination of game play data.

2. The platform of claim 1 where the entity owns or operates a physical entity location to be visited by the person, where an entity location comprises any one of or any combination of an amusement park, theme park, outdoor park, museum, airport, shop, restaurant, cruise ship, casino, resort, hotel, educational building or campus, or otherwise business establishment, where engagement experiences comprise any one of or any combination of rides, shows, movies, presentation output displays or otherwise entertainment, and where the person receives the engagement experience, or an alteration of an engagement experience while visiting the entity location after playing the interactive board game, where the determination of the engagement experience is based at least in part upon the game play data.

3. The platform of claim 1 where the entity sells products or services, and where the person receives one or more sales benefits related to the purchase of products or services based at least in part upon the game play data.

4. The platform of claim 1 where the entity creates or otherwise influences the creation or distribution of story-telling content comprising any one of or any combination of audio, pictures, video, or textual information including movies, shows or books, where an engagement experience is, or is related to, any of the story-telling content, and wherein any one of or any combination of:

the engagement experience is provided to the person substantially while the person is currently playing a game using the interactive game board, where the timing of the engagement experience is coordinated with the public distribution of the storying-telling content, where coordination includes any of before, during or after the public distribution, and where two or more persons playing the same entity game that would otherwise receive the same engagement experiences are caused to receive different engagement experiences, where the resulting game play data determined regarding the two or more persons is compared, and where the entity alters any of the creation of, influence of, or public distribution timing of any of the story-telling content based at least in part upon the compared resulting game play data.

5. The platform of claim 1 where the entity owns or operates a physical entity location to be visited by the person, where activity of the person is tracked while the person is at the entity location, where tracked activity comprises any one of or any combination of entity experiences received or engaged and entity products or services received or purchased, where the person receives the engagement experience while playing the interactive board game after visiting the entity location, and where the engagement experience is determined based at least upon any one of or any combination of entity location tracked activity.

6. The platform of claim 1 where the engagement experience comprises digital game information comprising any one of or any combination of audio, pictures, video, text or otherwise data for providing or causing any of a visual, auditory, tactile, or olfactory experiences.

7. The platform of claim 6 where the interactive came board is further adapted to use one or more game apps, where a game app determines and provides, or otherwise causes to provide, at least one datum of digital game information to a player during on-going current game play based at least in part upon any one of or any combination of the current game play data or prior determined resulting game play data, where the at least one datum of digital game information is output or otherwise caused to be output on either a first device that is executing the game app or on a second device that is not executing the game app, where a first device includes any of a mobile device, computing device or a mirror-display, where a second device includes any of a first device or an electronically controllable wearable, where an electronically controllable wearable includes any of glasses, a necklace, wristband or watch, a sash or smart scarf, or a hat, and where any of the first or second devices is functioning as a shared-public device, a shared-private device, or a private device.

8. The platform of claim 1, where:

the game piece identifying data is electronically determinable;

the interactive game board comprises two or more electronically determinable physical locations over or upon which any of the one or more game pieces can be placed in accordance with the currently on-going game;

the interactive game board further comprises game electronic means for determining the identifying data of any game piece currently located over or upon any of the two or more physical game piece locations, where the tracked location of the any game piece comprises the determined current association between the identifying data of the any game piece and the current physical game piece location, and where the interactive game board further comprises a game app for determining the current game play data related to any of the two or more sessions of game play, where the game app is adapted to:

receive game piece tracked location data from the game electronic means, and determine the current game play data.

9. The platform of claim 8, where the interactive game board comprises:

one or more game board overlays each comprising two or more determinable logical locations over or upon which a game piece can be placed in accordance with any of the two or more sessions of game play, where each game board overlay comprises a determinable identification code;

a game board base in communication with the game electronic means upon which a game board overlay is overlaid for conducting the current session of game play, where the game board base comprises the two or more electronically determinable physical locations over or upon which a game piece can be placed;

one or more mapping datasets of pre-known mapping information comprising information for relating a determined physical location of the game board base with a logical location of an overlaid game board overlay, where each mapping dataset is associated with at least a game overlay identification code;

where the game piece tracked location data determined by the game electronic means comprises the specific physical location substantially over or upon which a game piece comprising a specific identifier is currently located during the on-going game, and where the game app is further adapted to:
  electronically or otherwise determine the unique identification code of the game board overlay currently being used in the on-going game, where the overlay identification code is current game play data;
  retrieve, receive or otherwise access the mapping dataset associated with the current game board overlay's unique identification code;
  receive game piece physical location data from the game electronic means as one or more game pieces are moved between logical locations of the current game board overlay in accordance with the on-going game, and
  determine the logical location over which a specific game piece is substantially located using at least in part the associated mapping dataset and at least in part the physical location data of the specific game piece, where the game piece tracked location data further comprises the determined logical location.

10. The platform of claim 9 further comprising:
an entity game repository that is in communications with the interactive game board for exchanging information, where the entity game repository comprises any one of or any combination of:
game directives comprising game apps, rules, clues, storylines, questions, tasks or other special content for use by the interactive game board for controlling, influencing, conducting or otherwise providing one or more unique games, where the person uses the interactive game board to download, retrieve, access or otherwise obtain any of a game directive, and where at least one of the game directives are in relation to, refer to, or otherwise require the use of at least one board game overlay;
game overlay descriptions including information sufficient for printing or otherwise creating a game overlay, where at least one board game overlay being used by a person to play a game using the interactive game board is generated based at least in part upon the game overlay descriptions;
a game mapping database comprising one or more mapping datasets;
game card descriptions including information sufficient for printing or otherwise creating a game card, where at least one game card being used by a person to play a game using the interactive game board is generated based at least in part upon the game card descriptions;
game figurine descriptions including information sufficient for 3D printing or otherwise creating a game figurine, where a game figurine is used as a game piece or attached to a game piece;
a game content database for storing and providing digital game information comprising any one of or any combination of audio, pictures, video, text or otherwise data for providing or causing any of a visual, auditory, tactile, or olfactory experiences, where digital game information is, or is related to one or more entity games, entity activities, products, services or otherwise engagement experiences, and where the interactive game board receives, retrieves or otherwise determines digital game information via communications with the game content database for provision to the person, and
a game play database for storing the current game play data, where the current game play data is any one of or any combination of:
  captured by an interactive game board being used by one or more persons;
  captured from two or more interactive game boards being used by distinct persons to play the same game using the same or different game overlays, and
  captured from one interactive game board being used by at least one person to play the same game using a succession of two or more different game overlays.

11. The platform of claim 10 where the entity creates or otherwise influences the creation or distribution of story-telling content comprising any one of or any combination of audio, pictures, video, or textual information including movies, shows or books, where the entity is providing an on-going story using story-telling content to the public, where the entity provides changes to the contents of the game repository to coincide with the on-going story such that the on-going experience of the person using the interactive game board to play an entity game evolves with the on-going story, where evolving includes any one of or any combination of receiving or otherwise being provided with updated game directives comprising any one of or any combination of game overlay descriptions, game overlays, game mapping datasets, game card descriptions, game cards, game figurine descriptions, game figurines, or game content.

12. The platform of claim 10 where the entity provides educational products or services, where the entity game repository further comprises:
  educational information and content comprising curriculum and lessons, where the educational information and content is any one of or any combination of digital information comprising audio, pictures, video, or text, and
  where directives comprising any one of or any combination of game overlay descriptions, game overlays, game mapping datasets, game card descriptions, game cards, game figurine descriptions, game figurines, or game content are adapted to reflect different curriculum and lessons.

13. The platform of claim 10 where the entity contracts or otherwise engages with a third-party to provide any one of or any combination of third-party information or third-party benefits in association with an entity game, where the third-party optionally purchases the rights to associate any third-party information or benefits with one or more specific logical locations on one or more specific game overlays, and where third-party benefits comprise promotional rewards, incentives, or discounts awarded to the person based at least in part upon any of game play datum.

14. The platform of claim 9 where a game base further comprises the game electronic means, such that the game base is active and electronically interacts with the game pieces.

15. A method for use by an entity to provide destination related engagement experiences to a person in correlation with an interactive game board, comprising the steps of:
  providing access to a remote game play database maintained by, for, or otherwise in relationship to the entity, where the remote entity game play database comprises person identifying data and resulting game play data, where the resulting game play data is determined at least in part from current game play data determined during two or more sessions of game play conducted by the person using an interactive game board;
  providing or otherwise using the interactive game board made available for use by the person to conduct the two or more sessions of game play, where the interactive game board is in communications with the remote database, where the interactive game board uses one or more game pieces each comprising game piece identifying data, and where the interactive game board tracks a current location of the one or more identifiable game pieces being moved about on the game board during game play, and where for each of the two or more sessions of game play the interactive game board determines current game play data comprising:

data associating the remote person identifying data with the current game piece identifying data of at least one of the one or more game pieces being used by the person for conducting a current session of game play;

the current location of the person's associated one or more game piece's on the interactive game board;

other current game play data provided to the remote entity game play database as resulting game play data in relation to the person comprising any one of or any combination of accumulated game play, awarded points, achievements, and accumulated scores, where accumulated game play includes information provided by players in response to game clues, questions, messages and other communications;

communicating between the remote game play database the interactive game board to exchange digital information comprising any one of or any combination of audio, pictures, video, text, game play data or otherwise data for providing or causing any of a visual, auditory, tactile, or olfactory experiences;

tracking one or more destination activities or purchases of a person when the person is visiting a destination, and providing at least one engagement experience to the person where:

the engagement experience is provided to the person while the person is visiting the destination and after the person plays at least one game using the interactive game board, where the determination of the destination engagement experience is based at least in part upon any of the resulting game play data;

the engagement experience is provided as a sales benefit to the person when purchasing entity or destination products or services, where the sales benefit is determined based at least in part upon any of the resulting game play data, or the engagement experience is provided to the person substantially while playing at least one game using the interactive game board after the person visits the destination, where the determination of the interactive game board provided engagement experience is based at least in part upon any of the tracked destination activities or purchases.

16. The method of claim 15 further adapted to provide the person with a new or extended interactive game experience without replacing the interactive game board, further comprising the steps of:

providing a game board base capable of being overlaid by a game board overlay, where the game board base comprises two or more electronically determinable physical locations over or upon which a game piece can be placed;

providing two or more game board overlays to the person to be selectively overlaid upon the game board base to extended the interactive game board experience, where each of the two or more game board overlays comprises two or more determinable logical locations upon which a game piece can be placed in accordance with a given on-going game, and where each of the two or more game board overlays comprises a determinable identification code;

providing a mapping dataset for use by the interactive game board to relate the physical locations of the game board base with the logical locations comprising each of the two or more game board overlays;

providing game electronics to determine the current physical location of a game piece with respect to the game board base, and wherein the interactive game board determines the current logical location of a game piece based at least in part upon the determined current physical location and at least in part upon a corresponding mapping dataset, where the current logical location is the tracked current location of a game piece on the interactive game board.

17. The method of claim 16 further adapted to provide third-party engagement experiences in relation to one or more board game overlays being played by one or more persons, further comprising the step of:

providing one or more third-party engagement experiences in association with a given logical location on a given board game overlay having a specific identification code, where the third-party pays or otherwise contracts with the entity for rights to the given logical location.

18. A method for use by an entity to provide a person with one or more engagement experiences, where the timing of the availability of the engagement experiences is in relation to the release to the public of a series of related story-telling content, where the story-telling content comprises any one of or any combination of audio, pictures, video, or textual information including movies, shows or books, comprising the steps of:

providing access to a remote game play database maintained by, for, or otherwise in relationship to the entity, where the remote entity game play database comprises person identifying data and resulting game play data, where the resulting game play data is determined at least in part from current game play data determined during two or more sessions of game play conducted by the person using an interactive game board;

providing or otherwise using the interactive game board made available for use by the person to conduct the two or more sessions of game play, where the interactive game board is in communications with the remote database, where the interactive game board uses one or more game pieces each comprising game piece identifying data, and where the interactive game board tracks a current location of the one or more identifiable game pieces being moved about on the game board during game play, and where for each of the two or more sessions of game play the interactive game board determines current game play data comprising:

data associating the remote person identifying data with the current game piece identifying data of at least one of the one or more game pieces being used by the person for conducting a current session of game play;

the current location of the person's associated one or more game piece's on the interactive game board;

other current game play data provided to the remote entity game play database as resulting game play data in relation to the person comprising any one of or any combination of accumulated game play, awarded points, achievements, and accumulated scores, where accumulated game play includes information provided by players in response to game clues, questions, messages and other communications;

communicating between the remote game play database and the interactive game board to exchange digital information comprising any one of or any combination of audio, pictures, video, text, game play data or otherwise data for providing or causing any of a visual, auditory, tactile, or olfactory experiences;

tracking the release of the story-telling content to the public, and using the interactive game board to make available for experiencing at least one engagement experience in relation to the release of at least one story-telling content in the series of story-telling content, where the relation is any of before the release, substantially during the release, or after the release of the at least one story-telling content.

19. The method of claim 18 further adapted to provide the person with a new or extended interactive game system experience related to the series of story-telling content without replacing the interactive game board, further comprising the steps of:

providing a game board base capable of being overlaid by a game board overlay, where the game board base comprises two or more electronically determinable physical locations over or upon which a game piece can be placed;

providing two or more game board overlays to the person to be selectively overlaid upon the game board base to extended the interactive game board experience timed with the release of at least one story-telling content in the series of story-telling content, where the timing is any of before the release, substantially during the release, or after the release of the at least one story-telling content, where each of the two or more game board overlays comprises two or more determinable logical locations upon which a game piece can be placed in accordance with a given on-going game, and where each of the two or more board game board overlays comprises a determinable identification code;

providing a mapping dataset for use by the interactive game board to relate the physical locations of the game board base with the logical locations comprising each of the two or more game board overlays;

providing game electronics to determine the current physical location of a game piece with respect to the game board base, and wherein the interactive game board determines the current logical location of a game piece based at least in part upon the determined current physical location and at least in part upon a corresponding mapping dataset, where the current logical location is the tracked current location of a game piece on the interactive game board.

20. The method of claim 19 where the entity: a) determines, alters, or otherwise affects some aspect of the timing of the release of any of the story-telling content, or b) determines, alters, or otherwise affects what story-telling content is to be released, and where the determination of any one of or any combination of (a) and (b) is based at least in part upon any of the game play data determined from one or more persons playing the interactive game board.

* * * * *